(12) United States Patent
Lee et al.

(10) Patent No.: US 11,943,783 B2
(45) Date of Patent: Mar. 26, 2024

(54) METHODS, DEVICES AND SYSTEMS FOR GRANT-LESS UPLINK MULTIPLE ACCESS

(71) Applicant: INTERDIGITAL PATENT HOLDINGS, INC., Wilmington, DE (US)

(72) Inventors: Moon-il Lee, Melville, NY (US); Afshin Haghighat, Ile-Bizard (CA); Erdem Bala, East Meadow, NY (US); Janet A. Stern-Berkowitz, Little Neck, NY (US); Mihaela C. Beluri, Jericho, NY (US); Ananth Kini, East Norriton, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 294 days.

(21) Appl. No.: 17/401,909

(22) Filed: Aug. 13, 2021

(65) Prior Publication Data

US 2021/0377924 A1 Dec. 2, 2021

Related U.S. Application Data

(63) Continuation of application No. 16/324,007, filed as application No. PCT/US2017/046293 on Aug. 10, 2017, now Pat. No. 11,096,162.

(Continued)

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1812* (2013.01); *H04L 1/1864* (2013.01); *H04W 72/044* (2013.01); *H04W 72/0453* (2013.01)

(58) Field of Classification Search
CPC ........... H04W 72/044; H04W 72/0453; H04W 72/23; H04L 1/1812; H04L 1/1864
See application file for complete search history.

(56) References Cited

U.S. PATENT DOCUMENTS

| 10,142,962 B2 | 11/2018 | Lee et al. |
| 10,659,968 B2 | 5/2020 | Chang et al. |

(Continued)

FOREIGN PATENT DOCUMENTS

| CN | 105634688 A | 6/2016 |
| JP | 2019-145845 | 8/2019 |

OTHER PUBLICATIONS

Interdigital Communications, "Considerations on UL grant-free transmissions for mMTC," 3GPP TSG RAN WG1 Meeting #86bis, R1-1609893, Lisbon, Portugal (Oct. 10-14, 2016).

(Continued)

*Primary Examiner* — Walter J Divito
(74) *Attorney, Agent, or Firm* — Volpe Koenig

(57) ABSTRACT

A wireless transmit/receive unit (WTRU) may receive configuration information indicating a set of physical channel frequency resources. The WTRU may receive downlink control information (DCI), and the DCI may include an indication of an allocation of at least a subset of the set of physical channel frequency resources. Further, the WTRU may determine a time period and one or more physical channel frequency resources from the subset of the set of physical channel frequency resources. The WTRU may transmit control information in a physical shared channel transmission using the determined one or more physical shared channel frequency resources during the determined time period. Also, the control information may include a WTRU-identifier (ID) associated with the WTRU. In an example, the control information may include a new data indicator (NDI) or a retransmission of previously transmit- (Continued)

ted control information. In a further example, the physical shared channel transmission may further include data.

20 Claims, 18 Drawing Sheets

Related U.S. Application Data

(60) Provisional application No. 62/474,838, filed on Mar. 22, 2017, provisional application No. 62/400,934, filed on Sep. 28, 2016, provisional application No. 62/373,040, filed on Aug. 10, 2016.

(51) Int. Cl.
  *H04L 1/1829* (2023.01)
  *H04W 72/044* (2023.01)
  *H04W 72/0453* (2023.01)

(56) References Cited

U.S. PATENT DOCUMENTS

| | | | |
|---|---|---|---|
| 11,470,619 | B2 | 10/2022 | Lee et al. |
| 2011/0171985 | A1 | 7/2011 | Papasakellariou et al. |
| 2016/0135240 | A1* | 5/2016 | Yoon .................... H04W 8/005 370/329 |
| 2016/0270102 | A1* | 9/2016 | Zeng ...................... H04W 4/70 |
| 2016/0309467 | A1* | 10/2016 | Yerramalli ........ H04W 72/0446 |
| 2017/0367110 | A1* | 12/2017 | Li ............................ H04W 4/70 |
| 2018/0035458 | A1 | 2/2018 | Islam et al. |
| 2019/0327030 | A1 | 10/2019 | Yoshimoto et al. |

OTHER PUBLICATIONS

Machine Translation of Yoshimoto et al. (JP 2019-145845A), retrieved from Espacenet, Aug. 2019, 62 pages (Year: 2019).
Nokia et al., "Basic Principles of Contention-Based Access,"3GPP TSG-RAN WG1 #86, R1-167252, Gothenburg, Sweden (Aug. 22-26, 2016).
Samsung, "Non-Orthogonal Multiple Access Considerations for NR,"3GPP TSG RAN WG1 #85, R1-163993, Nanjing, China (May 23-27, 2016).
Third Generation Partnership Project, "Technical Specification Group Radio Access Network; Evolved Universal Terrestrial Radio Access (E-UTRA); Physical channels and modulation (Release 13),"3GPP TS 36.211 V13.6.0 (Jun. 2017).
Third Generation Partnership Project, "Technical Specification Group Radio Access Network; Evolved Universal Terrestrial Radio Access (E-UTRA); Physical channels and modulation (Release 14),"3GPP TS 36.211 V14.3.0 (Jun. 2017).
Third Generation Partnership Project, "Technical Specification Group Radio Access Network; Evolved Universal Terrestrial Radio Access (E-UTRA); Multiplexing and channel coding (Release 13),"3GPP TS 36.212 V13.2.0 (Jun. 2016).
Third Generation Partnership Project, "Technical Specification Group Radio Access Network; Evolved Universal Terrestrial Radio Access (E-UTRA); Multiplexing and channel coding (Release 13),"3GPP TS 36.212 V13.6.0 (Jun. 2017).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.3.0 (Jun. 2017).
Third Generation Partnership Project, "Technical Specification Group Radio Access Network; Evolved Universal Terrestrial Radio Access (E-UTRA); Physical layer procedures (Release 13)," 3GPP TS 36.213 V13.2.0 (Jun. 2016).
Third Generation Partnership Project, "Technical Specification Group Radio Access Network; Evolved Universal Terrestrial Radio Access (E-UTRA); Physical layer procedures (Release 13)," 3GPP TS 36.213 V13.6.0 (Jun. 2017).
Third Generation Partnership Project, "Technical Specification Group Radio Access Network; Evolved Universal Terrestrial Radio Access (E-UTRA); Physical layer procedures (Release 14)," 3GPP TS 36.213 V14.3.0 (Jun. 2017).
Third Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 13)3GPP TS 36.300 V13.4.0 (Jun. 2016).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.8.0 (Jun. 2017).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.3.0 (Jun. 2017).
Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.2.0 (Jun. 2016).
Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.6.1 (Jul. 2017).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.3.0 (Jun. 2017).
Third Generation Partnership Project, "Technical Specification Group Radio Access Network; NR; Physical channels and modulation (Release 15)," 3GPP TS 38.211 V0.1.0 (Jun. 2017).
Third Generation Partnership Project, "Technical Specification Group Radio Access Network; NR; Radio Resource Control (RRC); Protocol specification (Release 15)," 3GPP TS 38.331 V0.0.4 (Jun. 2017).
Third Generation Partnership Project, "Technical Specification Group Radio Access Network; NR; NR and NG-RAN Overall Description; Stage 2 (Release 15)," 3GPP TS 38.300 V0.4.1 (Jun. 2017).
Third Generation Partnership Project, "Technical Specification Group Radio Access Network; NR; Multiplexing and channel coding (Release 15)," 3GPP TS 38.212 V0.0.0 (May 2017).
Third Generation Partnership Project, "Technical Specification Group Radio Access Network; Evolved Universal Terrestrial Radio Access (E-UTRA); Physical channels and modulation (Release 13)," 3GPP TS 36.211 V13.2.0 (Jun. 2016).
Huawei et al., "Multiple access for UL small packets transmission," 3GPP TSG RAN WG1 Meeting #85, R1-164036, Nanjing, China, (May 23-27, 2016).
NTT Docomo, Inc., "Forward compatibility related to mMTC and URLLC," 3GPP TSG RAN WG1 Meeting #85, R1-165172, Nanjing, China (May 23-27, 2016).
NTT Docomo, Inc., "Uplink multiple access schemes for NR," 3GPP TSG RAN WG1 Meeting #85, R1-165174, Nanjing, China (May 23-27, 2016).

* cited by examiner

METHODS, DEVICES AND SYSTEMS FOR GRANT-LESS UPLINK MULTIPLE ACCESS

CROSS REFERENCE TO RELATED APPLICATIONS

This application is a continuation of U.S. patent application Ser. No. 16/324,007 filed Feb. 7, 2019, which issued as U.S. Pat. No. 11,096,162 B2 on Jul. 28, 2021, which is the U.S. National Stage, under 35 U.S.C. § 371, of International Application No. PCT/US2017/046293 filed Aug. 10, 2017, which claims the benefit of U.S. Provisional Application Ser. No. 62/373,040 filed Aug. 10, 2016, U.S. Provisional Application Ser. No. 62/400,934 filed Sep. 28, 2016 and U.S. Provisional Application Ser. No. 62/474,838 filed Mar. 22, 2017, the contents of which are hereby incorporated by reference herein.

BACKGROUND

Applications of New Radio (NR), also known as Next Generation Radio or Fifth Generation (5G), can be summarized under three main categories which are: enhanced mobile broadband (eMBB), massive machine-type communications (mMTC) and ultra-reliable-and-low-latency communications (URLLC). Under each category, there are a wide set of applications that are considered for various needs and deployment scenarios that mandate specific performance requirements. For example, mMTC and URLLC applications range from automotive to health, agriculture, utilities and logistics industries. Realization of mMTC and URLLC features may require the design of new modulation and coding schemes, waveforms, feedback processes, beamforming mechanisms, as well as new multiplex access methods.

For mMTC applications, it is expected that the system would be able to support up to one million mMTC devices per square kilometer, but transmission delay for such applications is not as critical as for other applications. For URLLC applications, the user equipment (UE) or wireless transmit/receive unit (WTRU) density per cell is significantly less but such applications call for a target delay of shorter than 1 millisecond (ms), along with a high reliability of $10^{-5}$ error probability for a 32 byte message. Despite the differences of these two use cases, they both require a new uplink multiple access (MA) method to enable them to achieve their target performance indicators.

SUMMARY

Methods, apparatuses and systems are provided for grant-based (GB) and grant-less (GL) uplink transmissions in a multiple access (MA) scheme. In an example, a wireless transmit/receive unit (WTRU) may receive a configuration of a set of GL Physical Uplink Shared Channel (GL-PUSCH) frequency resources. The WTRU may monitor for a downlink control information (DCI) message, wherein the DCI message includes an indication of a presence of at least a subset of the set of GL-PUSCH frequency resources. If the WTRU successfully receives the DCI message, the WTRU may select one or more GL-PUSCH frequency resources from the subset of the set of GL-PUSCH frequency resources and may select a time period. The WTRU may transmit data on a GL-PUSCH using the selected one or more GL-PUSCH frequency resources during the selected time period.

Further, the WTRU may also determine a time location for reception of hybrid automatic repeat request acknowledgement (HARQ-ACK), associated with the transmitted GL-PUSCH data, based on the selected one or more GL-PUSCH frequency resources. The WTRU may monitor for the reception of the HARQ-ACK during the determined time location. The determination of the time location may be further based on a GL-PUSCH resource index, in another example.

In an example, the DCI message may be a common DCI message. In a further example, the selection of the one or more GL-PUSCH frequency resources from the subset of GL-PUSCH frequency resources may be determined randomly. In an additional example, the selection of the one or more GL-PUSCH frequency resources from the subset of GL-PUSCH frequency resources may be determined based on a WTRU-identifier (ID). In still another example, the selection of the time period may be determined randomly. In yet another example, the selection of the time period may be determined based on a WTRU-ID.

Further, in an example, the WTRU may monitor for the DCI during a first fixed time window. In another example, the time location may be with a second fixed time window.

In another example, a WTRU may receive configuration information indicating a set of physical channel frequency resources. The WTRU may receive DCI. In an example, the DCI may include an indication of an allocation of at least a subset of the set of physical channel frequency resources. Further, the WTRU may determine a time period and one or more physical channel frequency resources. In an example, the one or more physical channel frequency resources may be determined from the subset of the set of physical channel frequency resources. The WTRU may transmit control information in a physical shared channel transmission using the determined one or more physical shared channel frequency resources during the determined time period.

In a further example, the control information may include a WTRU-ID associated with the WTRU. In an example, the control information may include a new data indicator (NDI). In another example, the control information may include a retransmission of previously transmitted control information. In an additional example, the physical shared channel transmission may further include data.

Further, the DCI may include feedback information. Also, the WTRU may be a source WTRU.

BRIEF DESCRIPTION OF THE DRAWINGS

A more detailed understanding may be had from the following description, given by way of example in conjunction with the accompanying drawings wherein.

DETAILED DESCRIPTION

Figure 1A:
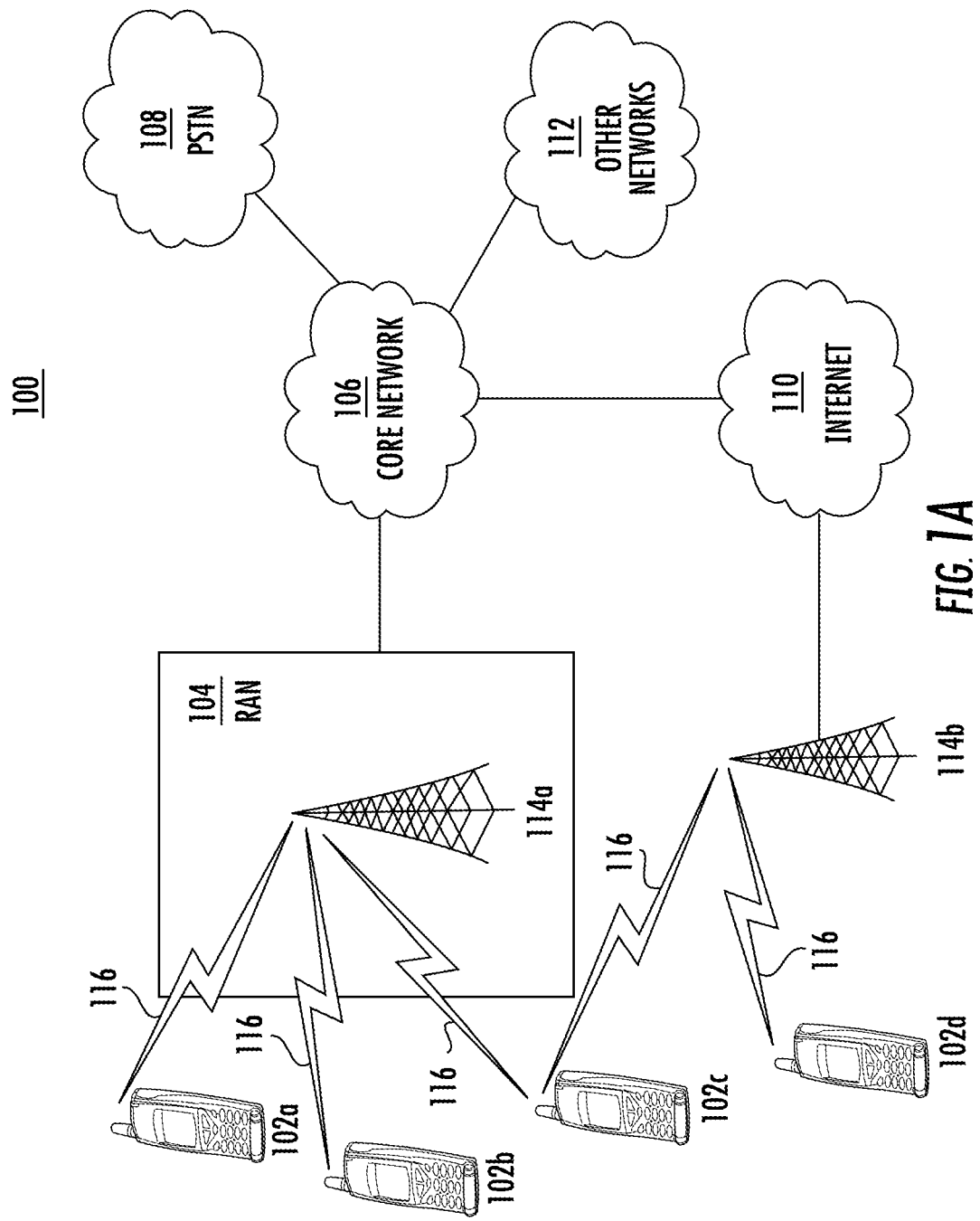
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform spread orthogonal frequency division multiplexing (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode-B, a Home Node B, a Home eNode B, a next generation (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one example, the base station 114a may include three transceivers, i.e., one for each sector of the cell. In an example, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (for example, radio frequency (RF), microwave, centimeter wave, micrometer wave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an example, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an example, the base station 114a and the WTRUs 102a, 102b, 102c may implement a radio technology such as NR Radio Access, which may establish the air interface 116 using NR.

In an example, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (for example, an eNB and a gNB).

In other embodiments, the base station 114a and the WTRUs 102a, 102b, 102c may implement radio technologies such as Institute of Electrical and Electronics Engineers (IEEE) 802.11 (i.e., Wireless Fidelity (WiFi)), IEEE 802.16 (i.e., Worldwide Interoperability for Microwave Access (WiMAX)), CDMA2000, CDMA2000 1x, CDMA2000 Evolution Data Only/Evolution Data Optimized (EV-DO), Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (for example, for use by drones), a roadway, and the like. In one example, the base station 114b and the WTRUs 102c, 102d may implement a radio technology such as IEEE 802.11 to establish a wireless local area network (WLAN). In an example, the base station 114b and the WTRUs 102c, 102d may implement a radio technology such as IEEE 802.15 to establish a wireless personal area network (WPAN). In yet another example, the base station 114b and the WTRUs 102c, 102d may utilize a cellular-based RAT (for example, WCDMA, CDMA2000, GSM, LTE, LTE-A, LTE-A Pro, NR and the like) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (for example, the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
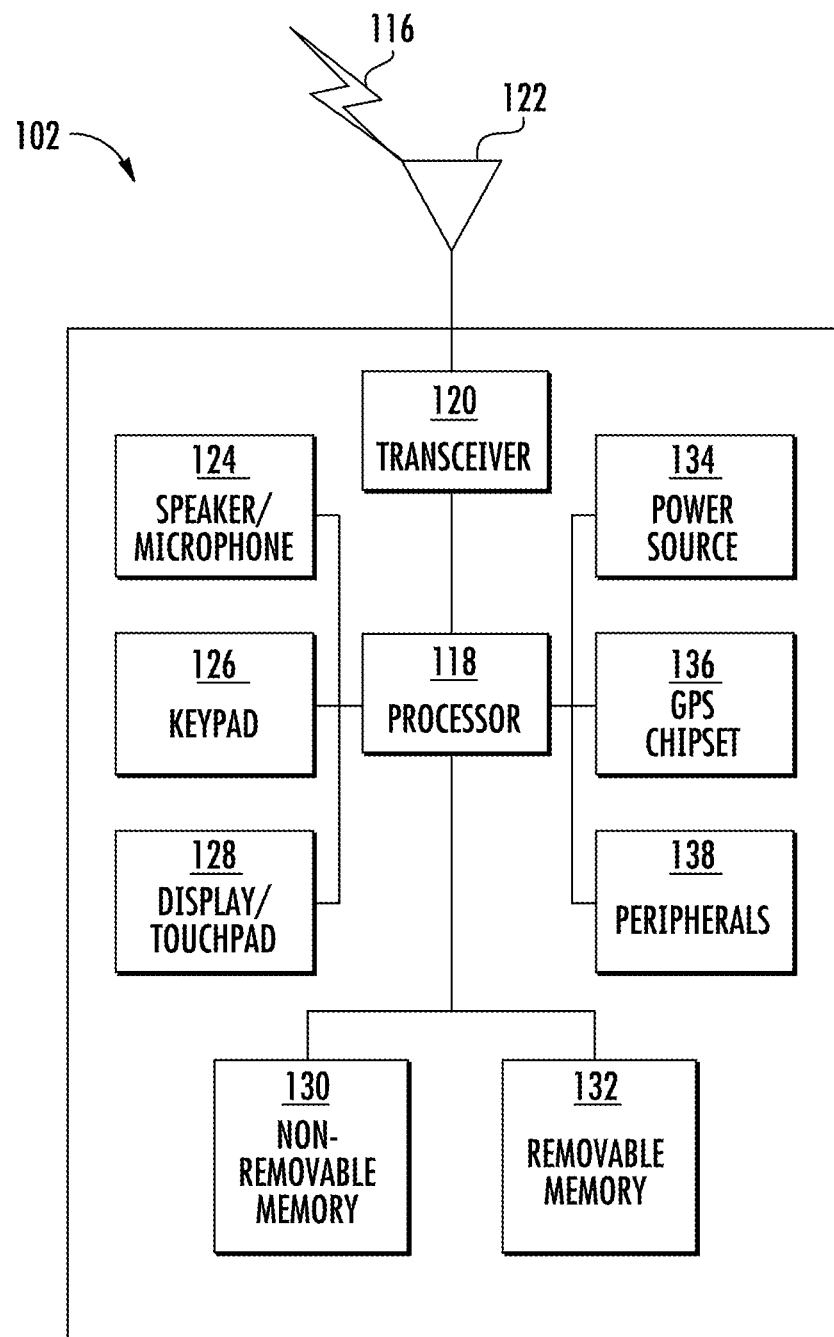
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (for example, the base station 114a) over the air interface 116. For example, the transmit/receive element 122 may be an antenna configured to transmit and/or receive RF signals. In an example, the transmit/receive element 122 may be an emitter/detector configured to transmit and/or receive IR, UV, or visible light signals, for example. In yet another example, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one example, the WTRU 102 may include two or more transmit/receive elements 122 (for example, multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (for example, a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (for example, nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (for example, longitude and latitude) regarding the current location of the WTRU 102. In addition to, or in lieu of, the information from the GPS chipset 136, the WTRU 102 may receive location information over the air interface 116 from a base station (for example, base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor, a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (for example, associated with particular subframes for both the UL (for example, for transmission) and DL (for example, for reception) may be concurrent and/or simultaneous. The full duplex radio may include an interference management unit to reduce and or substantially eliminate self-interference via either hardware (for example, a choke) or signal processing via a processor (for example, a separate processor (not shown) or via processor 118). In an example, the WTRU 102 may include a half-duplex radio for which transmission and reception of some or all of the signals (for example, associated with particular subframes for either the UL (for example, for transmission) or the DL (for example, for reception)).

Figure 1C:
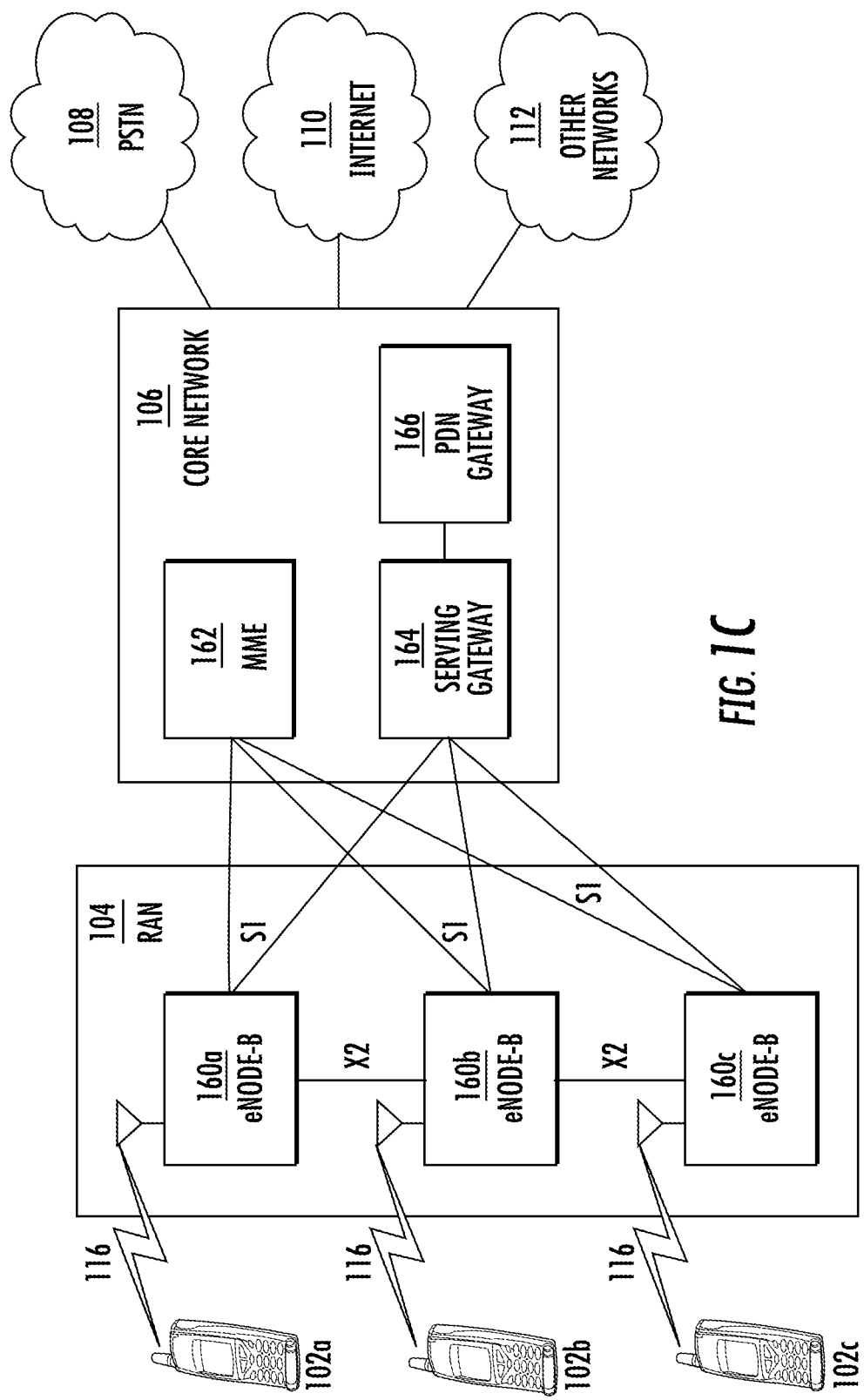
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one example, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (for example, an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (for example, temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (for example, directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (for example, all of the STAs) within or using the IBSS may communicate directly with each other. The IBSS mode of communication may sometimes be referred to herein as an ad-hoc mode of communication.

When using the 802.11ac infrastructure mode of operation or a similar mode of operations, the AP may transmit a beacon on a fixed channel, such as a primary channel. The primary channel may be a fixed width (for example, 20 megahertz (MHz) wide bandwidth) or a dynamically set width, set via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (for example, every STA), including the AP, may sense the primary channel. If the primary channel is sensed/detected and/or determined to be busy by a particular STA, the particular STA may back off. One STA (for example, only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 gigahertz (GHz) modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (for example, only support for) certain and/or limited bandwidths. The MTC devices may include a battery with a battery life above a threshold (for example, to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (for example, MTC type devices) that support (for example, only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, the entire available frequency bands may be considered busy even though a majority of the frequency bands remains idle and may be available.

In the United States, the available frequency bands which may be used by 802.11ah are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
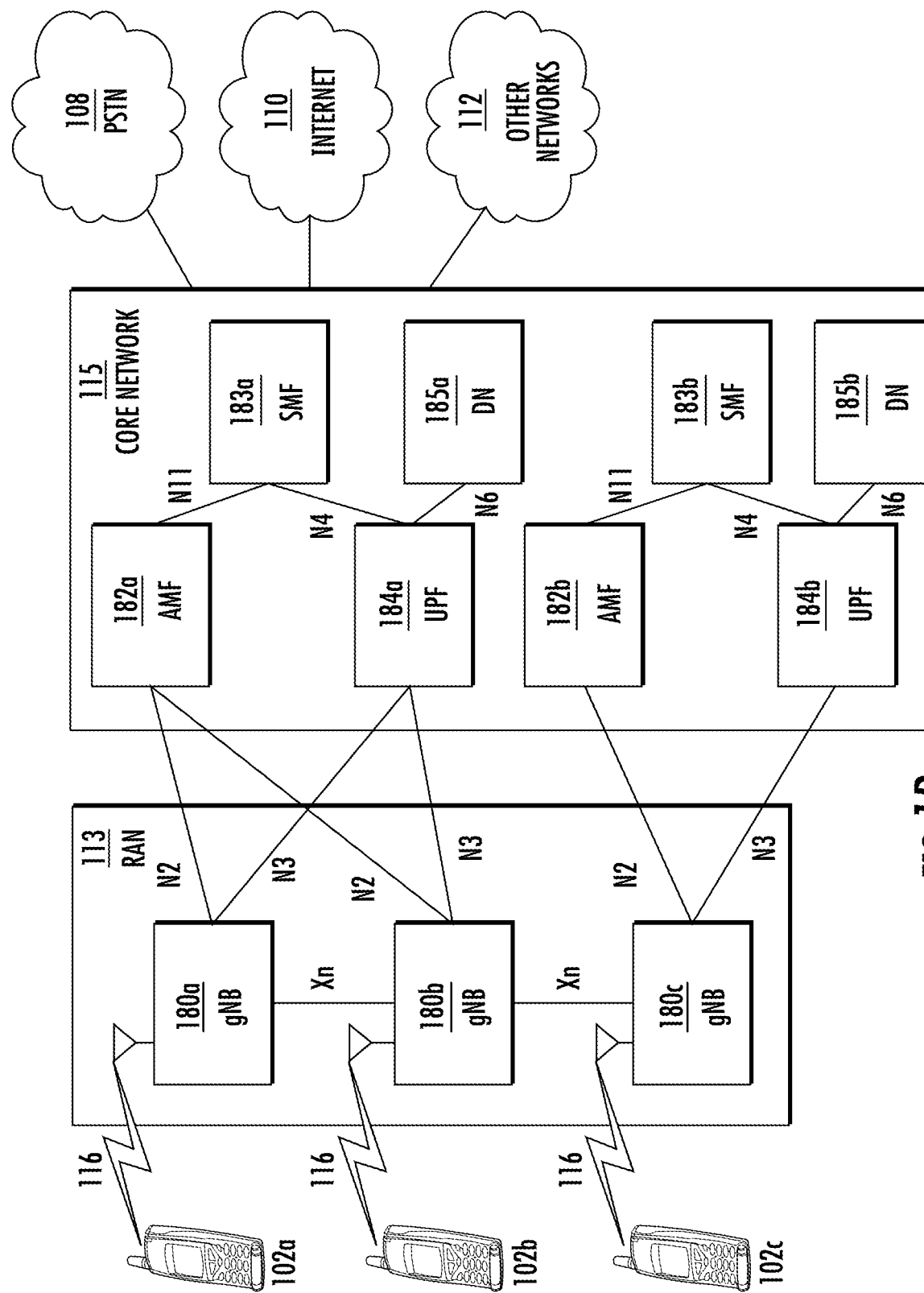
FIG. 1D is a system diagram illustrating a further example RAN and a further example CN that may be used within the communications system illustrated in FIG. 1A.

FIG. 1D is a system diagram illustrating the RAN 113 and the CN 115. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one example, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an example, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an example, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths, for example, containing a varying number of OFDM symbols and/or lasting varying lengths of absolute time.

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (for example, such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements is depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (for example, handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases, such as services relying on ultra-reliable low latency (URLLC) access, services relying on enhanced massive mobile broadband (eMBB) access, services for MTC access, and/or the like. The AMF 182a, 182b may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 115 may facilitate communications with other networks. For example, the CN 115 may include, or may communicate with, an IP gateway (for example, an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one example, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-ab*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may perform testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (for example, testing) wired and/or wireless communication network in order to implement testing of one or more components. The one or more emulation devices may be test equipment. Direct RF coupling and/or wireless communications via RF circuitry (for example, which may include one or more antennas) may be used by the emulation devices to transmit and/or receive data.

Multiple access (MA) is a scheme in which multiple users (for example, multiple WTRUs) gain access to resources monitored and controlled by an eNode-B and use the resources simultaneously. For example, OFDMA uses several carriers carrying data independently of each other and not interfering with each other.

In LTE, uplink access is may be enabled by a contention-free procedure. WTRUs are configured to use a specific Physical Uplink Control Channel (PUCCH) resources to initiate the access process. In a case of absence of scheduled scheduling request (SR) resources, a WTRU may kick start the access process through a random access channel (RACH) procedure.

Figure 2:
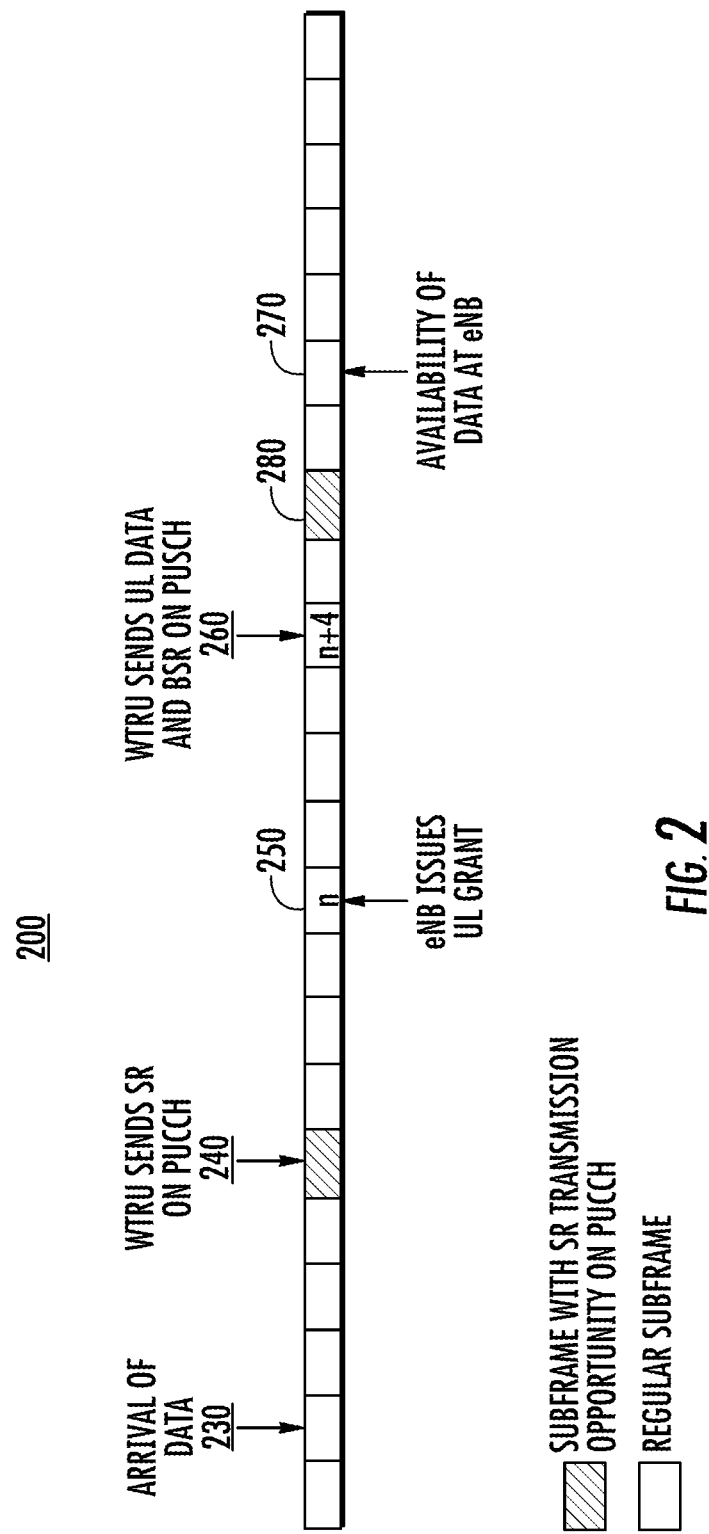
FIG. 2 is a timing diagram of an example scheduling request (SR) process in Long Term Evolution (LTE)

FIG. 2 is a timing diagram of an example SR process in LTE. As shown in an example in timing diagram 200, a procedure for contention-free uplink access in LTE may assume an SR interval of 10 milliseconds (ms). The SR process for a contention-free uplink access can be summarized in the following main operations. A WTRU may notice the arrival of uplink data at the uplink buffer of the WTRU 230. The WTRU may then await for a subframe with an SR transmission opportunity (1-9 ms), and send the SR using dedicated resources on an uplink control channel (for example, PUCCH) during the SR transmission opportunity 240. SR transmission opportunity 240 is earlier in time than SR transmission opportunity 280 and may be the first available SR transmission opportunity after the arrival of uplink data at the uplink buffer of the WTRU 230. Upon reception of the SR, an eNode-B issues the WTRU an uplink grant for a Physical Uplink Shared Channel (PUSCH) transmission 250, which may be issued during a regular subframe. After receiving the grant, the WTRU may send the uplink data 260 on a PUSCH. If required, the WTRU may also send its buffer status report (BSR) in the same subframe 260. According to the received BSR, the eNode-B may schedule resources for a further PUSCH transmission. In a later time, the transmitted uplink data by the WTRU may be received by and be available at eNode-B 270.

As outlined, the SR process requires coordination and control between the WTRU and eNode-B. Assuming success of the initial SR transmission on the PUCCH, the completion of the SR process may take about 20 ms before the actual PUSCH transmission.

Hereafter, an uplink data transmission with an uplink grant (for example, downlink control information (DCI) for scheduling) may be referred to as a DCI message, a grant-based PUSCH transmission (GB-PUSCH) and an uplink data transmission without an uplink grant may be referred to as grant-less (GL) PUSCH (GL-PUSCH) transmission. A PUSCH transmission may be interchangeably used with an uplink transmission, an uplink data transmission, and an uplink control information transmission. Hereafter, the uplink resource which may be used for GL-PUSCH may be referred to as a GL-PUSCH resource and the uplink resource which may be used for GB-PUSCH may be referred to as a GB-PUSCH resource. One or more of following may apply. In examples used herein, an SR may be a contention-based SR (CB-SR) and an SR resource may be a CB-SR resource, and these terms may be used interchangeably. Also, as used herein, the terms control part, control channel, control channel information and control information may be used interchangeably.

Because of the density of WTRUs in an massive machine-type communications (mMTC) application, it is not efficient to employ a contention-free access for every mMTC WTRU. Employing contention-free access for every mMTC WTRU requires several steps of uplink/downlink signaling; thus, significantly reducing the spectrum efficiency of the system. From the URLLC application perspective, a URLLC WTRU may have as a main objective transmitting its packet with the least amount of delay. Thus, the objective may prohibit the use of regular scheduling and grant process.

Considering mMTC and URLLC use cases, there is motivation to develop a grant-less MA process to enable fast reliable access for URLLC WTRUs and serve a high number of mMTC WTRUs with the least amount of control overhead.

The following example aspects are considered herein: CB-SR, independent transmission of SR and GL-PUSCH, grant-less uplink transmission and hybrid automatic repeat request (HARQ) design, beam selection consideration, format of grant-less UL transmissions, and grant-less access resource provisioning.

CB-SR procedures for MA are provided in examples herein. For example, an SR may be a request for one or more resources, such as, for example, UL resources, that may be used for UL data transmission. An SR may be a request for grant based resources such as a GB-PUSCH. An SR may comprise at least one bit. In an example, an SR may comprise a single bit.

CB-SR resources may be provided and/or used during the CB-SR procedure. CB-SR resources may be used, for example, simultaneously, by one or more WTRUs in a group of WTRUs that may be assigned or configured with a set of CB-SR resources. The transmissions of WTRUs that transmit an SR on a CB-SR resource may coherently combine.

When multiple WTRUs transmit an SR on the same CB-SR resource, an eNode-B that receives the CB-SR resource may receive the SRs with a higher signal-to-noise ratio (SNR) than when one WTRU send one SR on the resource. When an eNode-B receives an SR on a CB-SR resource, the eNode-B may understand that at least one WTRU in a group of WTRUs that may use a CB-SR resource may have sent the SR.

A WTRU may be assigned and/or configured with a set of at least one resource that may be used for an SR, for example, a CB-SR. A set, such as, for example, a same set, of at least one resource that may be used for an SR, for example, a CB-SR, may be assigned to and/or configured for a group of one or more WTRUs. In another example, a WTRU may choose or determine a set or subset of CB-SR resources, for example, from a set of CB-SR resources that may be available in a cell. The configuration of CB-SR resources that may be available in a cell may be broadcast by an eNode-B.

A WTRU, for example, a WTRU that may intend to make a grant-less transmission, may determine at least one resource to be used for an SR. For example, a WTRU may select a resource from a set of assigned, configured, or determined resources. A WTRU may transmit an SR on a determined or selected SR resource.

An eNode-B that receives an SR on a CB-SR resource may respond with a grant for resources, for example, GB-PUSCH resources, that may be used for data transmission. The grant may be directed to a group of WTRUs that may use the CB-SR resource, for example a group of WTRUs that may be configured with and/or may use the CB-SR resource.

The intended group may be indicated with a group identifier. A WTRU that transmits a CB-SR may expect a response with a grant that may be intended for a group. The response may be referred to as a CB-SR response. A CB-SR response may provide a grant for resources, for example, GB-PUSCH resources, to one or more WTRUs. A WTRU, for example, a WTRU that transmits a CB-SR, may monitor for a CB-SR response. A WTRU may monitor for a CB-SR response that corresponds to, for example, be directed to, the group, for example, via a group identifier, associated with the CB-SR that the WTRU transmitted.

If a WTRU receives a CB-SR response that is intended for the WTRU, for a group it belongs to, or for a group associated with the CB-SR the WTRU had transmitted, the WTRU may transmit on the granted resource(s) (for example, using a GB-PUSCH). The WTRU may determine that a CB-SR response is intended for a group based on a group identifier.

A WTRU that is in a group (for example, a group associated with a set of SR resources) may be configured with a group identifier. A set of CB-SR resources may be associated with a group identifier. A WTRU may be configured with a group identifier that is associated with a set of CB-SR resources it may use. A WTRU may use a configured group identifier for monitoring for a CB-SR response, receiving a CB-SR response or both.

A WTRU may determine a group identifier to use for monitoring and/or receiving a CB-SR response, for example, based on the CB-SR resource or resource set the WTRU may use for transmission of a CB-SR. A WTRU may use the determined group identifier for monitoring a CB-SR response, receiving a CB-SR response or both.

A group identifier may be a Radio Network Temporary Identifier (RNTI), such as, for example, a group-RNTI (G-RNTI). A cyclic redundancy check (CRC) of a control channel that may be intended for a group may be masked or scrambled with a G-RNTI.

A collision may occur, for example, when more than one WTRU may transmit on a granted resource such as a GB-PUSCH. A collision may occur, for example, when more than one WTRU in a group may transmit an SR on a CB-SR resource and receive a granted resource (for example, with a corresponding group identifier).

One or more of the following examples may apply to avoid a collision and/or enable WTRU separation when a same resource may be used by multiple WTRUs. In an example, different WTRUs may transmit different demodulation reference signals (DMRSs), for example when transmitting on the same resource. In a further example, different WTRUs may transmit on different resources that may be associated with a resource grant, for example, one resource grant.

For example, a WTRU may be configured with a DMRS pattern that the WTRU may use when transmitting on a granted resource that may be used by multiple WTRUs. A DMRS pattern may be configured, for example, semi-statically such as by radio resource control (RRC) signaling. A DMRS pattern may be chosen from among a set of DMRS patterns. The set may be fixed or configured, for example, semi-statically such as by RRC signaling. The set may be identified in a grant, for example, the CB-SR response grant. A WTRU may determine a DMRS pattern based on a configured or known set of patterns.

A DMRS pattern may be determined, defined, or configured based on at least one of time/frequency locations, cyclic shift index, scrambling sequence index, orthogonal cover code index, and transmission power level.

For example, DCI that is for a CB-SR response, may include a DMRS indicator or an indication of a DMRS pattern set. A WTRU may determine a DMRS pattern based on the DMRS indicator or choose a DMRS pattern from among the set.

A WTRU may determine and/or choose a DMRS pattern based on at least one of: a DMRS indicator, a DMRS pattern set, a WTRU identifier (ID) (for example, International Mobile Subscriber Identity (IMSI)), and/or a configured value or ID (for example, cell-RNTI (C-RNTI), resume ID and the like).

In another example, a set of granted resources (for example, GB-PUSCH resources) may be used. The set may be configured (for example, semi-statically) and/or indicated in a DCI message that may be for a CB-SR response. A WTRU may determine or choose a granted resource (for example, GB-PUSCH) from among the configured and/or indicated set of resources bases on at least one of a WTRU ID (for example, IMSI), and/or a configured value or ID (for example, C-RNTI, resume ID).

A WTRU may transmit on a determined or selected granted resource using a determined or selected DMRS pattern. In an example, a WTRU may transmit on a determined or selected GB-PUSCH using a determined or selected DMRS pattern.

A WTRU may include in a transmission on a granted resources information that may identify or further identify the WTRU, the WTRU's capabilities, the WTRU's traffic type, and the like.

Figure 3:
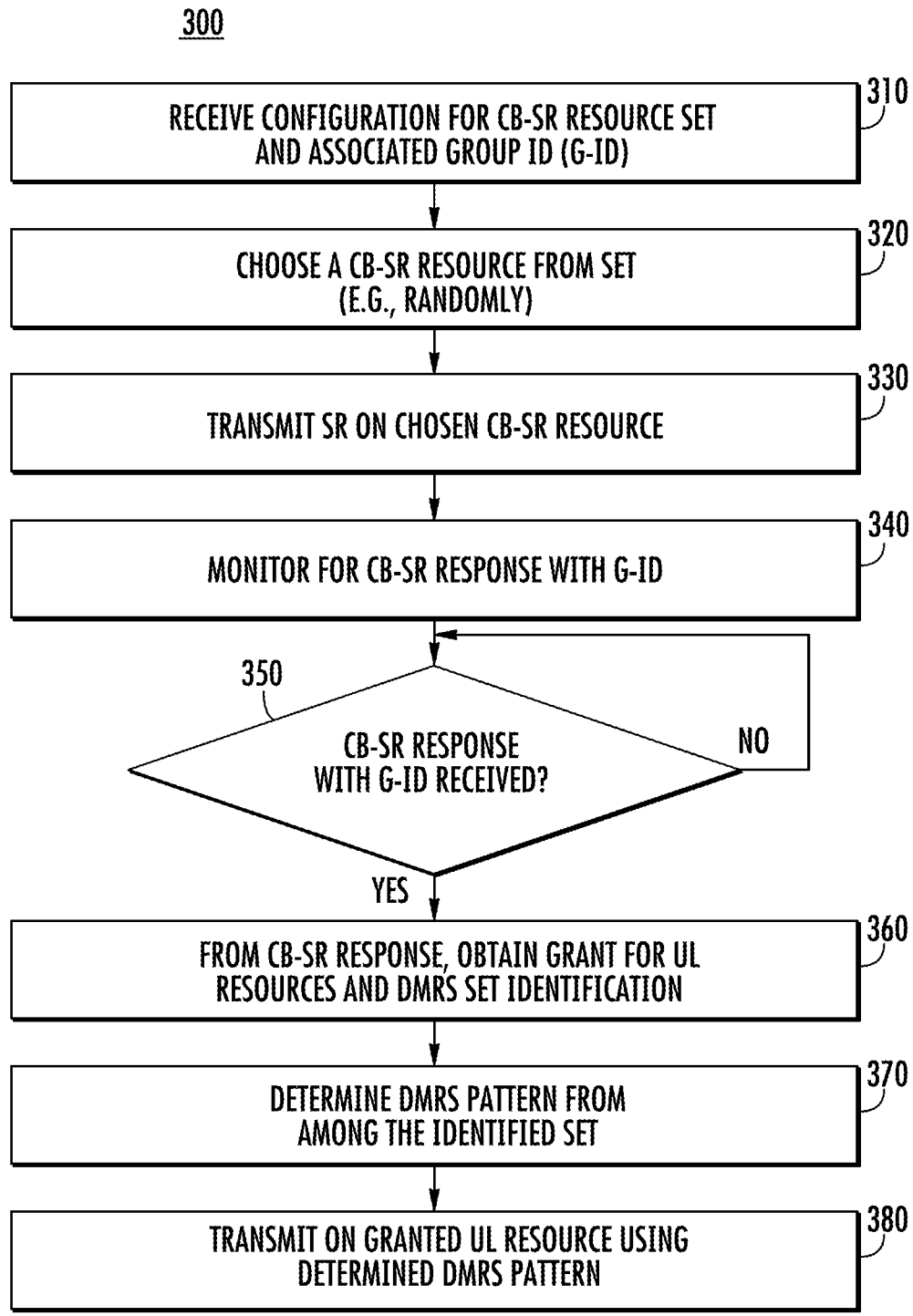
FIG. 3 is a flowchart diagram of an example procedure using contention-based SR (CB-SR)

FIG. 3 is a flowchart diagram of an example procedure using contention-based SR (CB-SR). As shown in flowchart diagram 300, a WTRU using CB-SR may receive a configuration for a CB-SR resource set and an associated group ID (G-ID) 310. The WTRU may then choose a CB-SR resource from the set of CB-SR resources 320. In an example, the WTRU may make this choice randomly. Further, the WTRU may transmit an SR on the chosen CB-SR resource 330. The WTRU may monitor for a CB-SR response that includes the G-ID 340. Also, the WTRU may continue monitoring until the CB-SR response is received or until a time period has lapsed 350. On a condition of receiving the CB-SR response, the WTRU may obtain a grant for UL resources and a DMRS set identification 360. The WTRU may also determine a DMRS pattern from among the identified set 370. In addition, the WTRU may transmit on the granted UL resource using the determined DMRS pattern 380.

Example procedures for independent transmission of both SR and GL-PUSCH transmissions are discussed herein. In an example, SR and GL-PUSCH transmissions may be transmitted concurrently in the process of independent transmission of both SR and GL-PUSCH transmissions. For example, in RRC_CONNECTED mode, a WTRU may attempt to make independent transmission of both SR and GL-PUSCH transmissions to increase the likelihood of a successful transmission and reduced the wait time for a high priority payload. The GL-PUSCH transmission may be based on a contention-based principle where multiple WTRUs attempt to use the same resources for transmission.

The GL-PUSCH transmission may contain a BSR or another form of indication of a WTRU buffer status to indicate whether subsequent PUSCH transmissions may follow. The indication of the buffer status may be explicit or implicit. An implicit indication may be realized through, for example, a specific use of DMRS, use of certain cyclic shifts, and the like.

Depending on the WTRU configuration of resources for transmission of Scheduling Request Indicators (SRI), the independent transmissions of an SR and a PUSCH may be simultaneous or offset in time.

Figure 4:
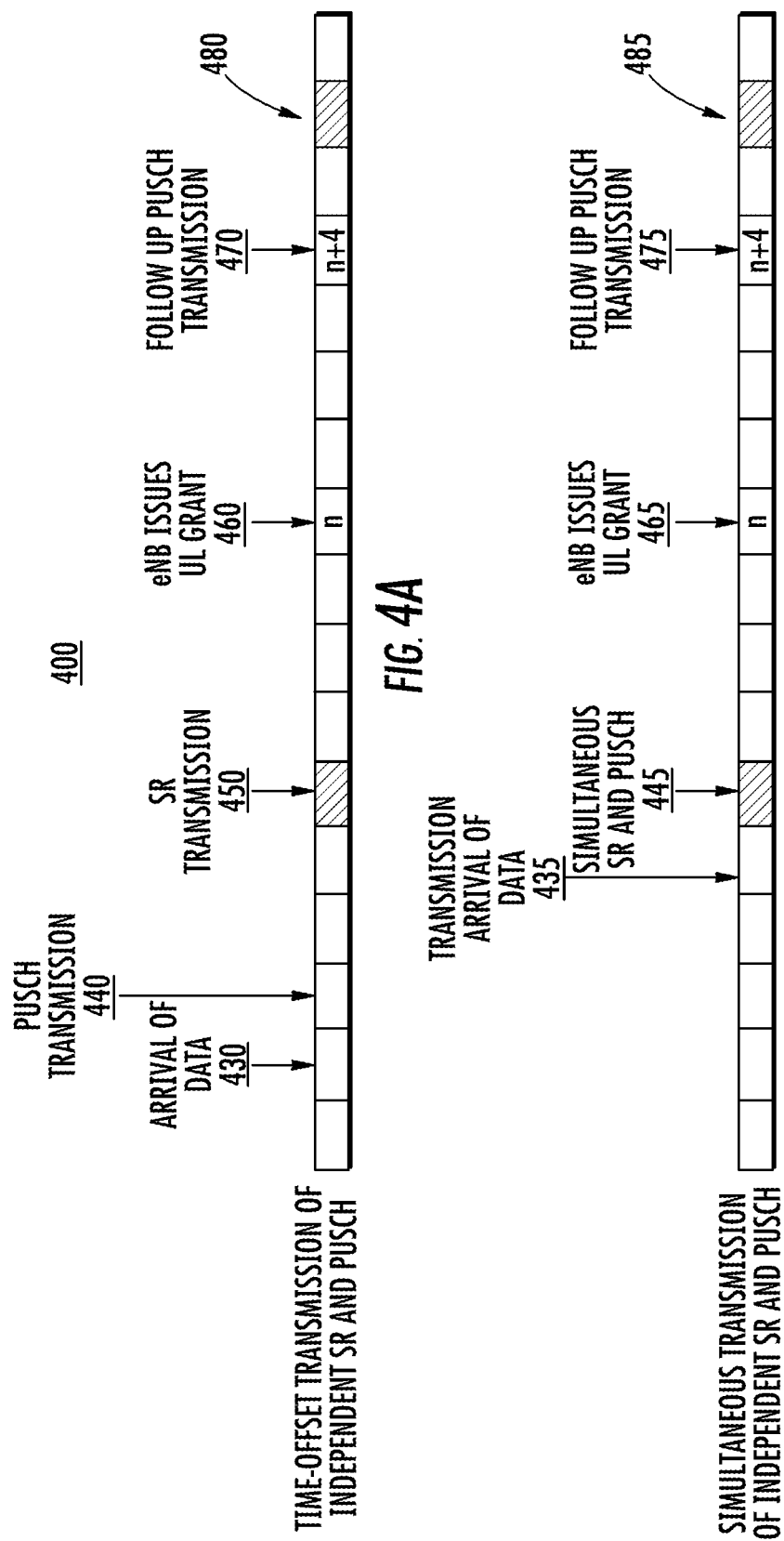
FIGS. 4A and 4B are timing diagrams of example SR processes.

FIGS. 4A and 4B are timing diagrams of example SR processes. FIGS. 4A and 4B show exemplary timelines for SR and PUSCH transmissions. FIG. 4A shows an example of time-offset independent transmissions of an SR and a PUSCH. As shown in timing diagram 400, a WTRU may determine the arrival of uplink data at the physical layer 430. The WTRU may then transmit a PUSCH 440. Further, the WTRU may await for a subframe with an SR transmission opportunity, and send the SR during the SR transmission opportunity 450. Upon reception of the SR, an eNode-B may issue the WTRU an uplink grant for a PUSCH transmission 460, which may be issued during a regular subframe. After receiving the grant, the WTRU may send the uplink data on a follow-up PUSCH transmission 470. In addition, the WTRU may be provided with a subframe with a further SR transmission opportunity 480.

FIG. 4B shows an example of simultaneous independent transmissions of an SR and a PUSCH transmissions. As shown in FIG. 4B, a WTRU may determine the arrival of uplink data at the physical layer 435. The WTRU may then send the SR transmission and a PUSCH transmission simultaneously during the SR transmission opportunity 445. Upon reception of the SR, an eNode-B may issue the WTRU an uplink grant for a PUSCH transmission 465, which may be issued during a regular subframe. After receiving the grant, the WTRU may send additional uplink data on a follow-up PUSCH transmission 475. In addition, the WTRU may be provided with a subframe with a further SR transmission opportunity 485.

As shown in an example in FIG. 4A the PUSCH transmission 440 may occur prior to the SR transmission 450. In comparison, in an example in FIG. 4B, the WTRU may transmit both SR and PUSCH transmissions simultaneously 445.

In another example shown in FIG. 4B, the WTRU may postpone the PUSCH transmission by at least one transmission period to avoid splitting its power. For example, the WTRU may transmit the SR without a PUSCH and then transmit a follow-up PUSCH transmission 475 at the later transmission period. In this way, the WTRU may avoid splitting its power between the SR transmission and the PUSCH transmission.

Dynamic determination of GL-PUSCH resources may be performed in the process of independent transmission of both SR and GL-PUSCH transmissions. For example, the WTRU may determine the size and location of the PUSCH resources on a dynamic basis through a Layer-1 (L1) control signaling. The L1 control signaling may be WTRU specific, or, alternatively, may target a group of WTRUs. In the case of targeting a group of WTRUs, the size of the resources may be defined based on the number of WTRUs and mission importance or quality of service of the group. The defined resource set may be permanent or valid for a specific time period, for example, based on a validity timer.

In a carrier-aggregated system, the defined resource set may or may not be on the same carrier component. Alternatively, to reduce the likelihood of collision, the WTRU may be configured to use two sets of resources defined on each component carrier. The resources set on each component carrier may be similar in size and location in the resource grid. The WTRU may determine the information about the resource set on the secondary component carriers explicitly or implicitly from the defined resource set for the primary component carrier.

WTRU behavior in response to success or failure of independent transmission may be determined in the process of independent transmission of both SR and GL-PUSCH transmission. For example, depending on the success of each transmission, a WTRU may adopt different steps to proceed. If an eNode-B decodes both SR and GL-PUSCH transmissions correctly, the eNode-B may process the received payload on the GL-PUSCH, and in response to the received SR it may issue an uplink grant for the follow up PUSCH transmission for the WTRU.

The uplink grant may be considered valid for a pre-defined number of transmission events. In an example, a WTRU may be configured to an expiry window length beyond which it shall not use the uplink grant for an uplink transmission. In a further example, upon reception of the uplink grant, a WTRU may use the uplink grant for either a new follow up first transmissions or a re-transmission. In an additional example, In follow up transmissions, a WTRU may indicate whether its uplink grant needs to be renewed or terminated early in case of an expiry window.

In a further example, the eNode-B may decode GL-PUSCH transmission correctly and fail to decode the SR. In this case, if the GL-PUSCH transmission contains a BSR or another form of indication of a WTRU buffer status, the eNode-B may determine whether the WTRU requires a further uplink grant and send an uplink grant accordingly.

Further, assuming WTRU transmissions of SR and GL-PUSCH transmissions in transmission intervals $n_{SR}$ and $n_{GL-PUSCH}$, the WTRU may initiate a RACH process if it does not receive an UL grant or a HARQ feedback by transmission event $n=\max(n_{SR}, n_{GL-PUSCH})+k$. If the eNode-B decodes the SR correctly, and fails to decode the GL-PUSCH transmission, a UL grant may be issued for a GB-PUSCH transmission.

Examples of GL uplink transmission and HARQ design are provided herein. In an example, a WTRU may transmit an uplink transmission without an uplink grant. In an example, the uplink grant may be signaled dynamically in each Transmission Time Interval (TTI). For example, a WTRU may transmit uplink data, for example, a PUSCH, in an uplink resource without scheduling.

Examples of GL-PUSCH resource configuration for grant-less UL transmission are provided herein. In an example, a WTRU may transmit a GL-PUSCH in one or more of uplink resources which may be configured, determined, and/or used for a GL-PUSCH transmission.

The uplink resource may include at least one of subframe, radio frame, physical resource block (PRB), PRB-pairs, DMRS cyclic shift index, resource element, symbol, sub-carrier, tone and the like. GL-PUSCH and/or GB-PUSCH resources may be determined, defined, used, and/or configured as a set of uplink resources. In an example, GL-PUSCH and/or GB-PUSCH resources may be determined as PRB-pairs in one or more subframes.

The one or more of uplink resources for GL-PUSCH transmission may be a subset of uplink resources which may be used for GB-PUSCH transmission. For example, the subset of GB-PUSCH resources may be configured or determined as GL-PUSCH resources which may be used for GL-PUSCH transmission or GB-PUSCH transmission. In a further example, a WTRU may transmit a GL-PUSCH transmission in a GL-PUSCH resource within configured or determined GL-PUSCH resources. In another example, the subset of GB-PUSCH resources which may be used for GL-PUSCH resources may be determined based on at least one of: a higher layer configuration; a dynamic indication in an associated DCI message; a function of one or more of system parameters including physical cell-ID, subframe number, and radio frame number; and a function of one or more of WTRU-specific parameters including WTRU-ID or UE-ID (for example, IMSI, System Architecture Evolution (SAE)-Temporary Mobile Subscriber Identity (TMSI) (s-TMSI), C-RNTI, and the like).

In an additional example, an associated DCI message for GB-PUSCH resource determination or configuration may be monitored or received by the WTRU in a known time location, for example, a subframe previous to sending the UL data. For example, an associated DCI message for a GB-PUSCH resource determination in a subframe n may be monitored by the WTRU in a subframe n−k, wherein n and k may each be a positive integer number. The associated DCI message for a GB-PUSCH resource determination or configuration may include at least one of following: a subset of PRB-pairs, one or more DMRS cyclic shift indices, one or more symbols and the like.

In an example, one or more frequency resources may be used for a GL-PUSCH transmission, and the location of one or more frequency resources may be determined based on a time index. The time index may include, for example, a subframe number, a TTI number and the like. Accordingly, one or more of following examples may apply.

In an example, one or more subbands may be used, determined, and/or configured for a GL-PUSCH transmission, such that a subband may be a consecutive one or more PRBs (or PRB-pairs) in a subframe. In a further example, the number of subbands may be determined based on a system bandwidth. In another example, the number of PRBs (or PRB-pairs) for a subband may be determined based on a system bandwidth. In an additional example, an index may be used for a subband and the subband index may be determined as an increasing order from the lowest PRB index.

In another example, a subset of subband indices may be used to indicate one or more frequency resources for a GL-PUSCH transmission. The subset of subband indices may be determined based on a subframe number, System Frame Number (SFN) number, or both. Further, the subset of subband indices may be different from one subframe to another.

In an additional example, among a set of subbands for GL-PUSCH transmission, one or more subbands may be used semi-statically and the rest of the subbands in the set may be configured, determined, and/or used with a dynamic indication. For example, if Na subbands are configured for GL-PUSCH transmission, a subset of Na (for example, Ns, where Ns≤Na) may be determined as a fallback set of GL-PUSCH resources, which may be considered as GL-PUSCH resources, and the remaining GL-PUSCH resources may be dynamically set on/off based on an indication, for example, a dynamic GL-PUSCH resource. The fallback set of GL-PUSCH resources may be used for a first type of uplink data traffic, for example, a URLLC, and the dynamic set of GL-PUSCH resource may be used for a second type of uplink data traffic, for example, mMTC.

In another example, the presence of one or more GL-PUSCH resources in a certain time window may be indicated in a known time/frequency location. For example, a set of GL-PUSCH resources may be configured, for example, via higher layer signaling, and the presence of the configured set of GL-PUSCH resources may be dynamically indicated.

For example, the presence indication of the GL-PUSCH resources may be received, and/or monitored by a WTRU in a known downlink control signal. For example, one or more downlink control resources, for example, a HARQ-acknowledgement (ACK) resource, may be reserved and may be used to indicate the presence of GL-PUSCH resources. A WTRU may transmit a GL-PUSCH transmission in the GL-PUSCH resources if the presence is indicated. The presence indication may be received, and/or monitored by WTRUs which may be configured, and/or determined to support GL-PUSCH transmission. The presence indication may be received, and/or monitored by WTRUs which may support a certain type of data traffic, for example, URLLC or mMTC. The presence of the GL-PUSCH resources may be implicitly indicated from a presence indication for other type of signals, for example, sounding reference signals (SRS).

In another example, a common uplink grant may be used to schedule uplink resources which may be used for GL-PUSCH transmission. For example, a common uplink grant may be used to indicate which uplink resources may be used for GL-PUSCH transmission. In an example, the common uplink may be a common DCI message. The common uplink grant may be monitored or received by WTRUs, which may be configured or determined to use GL-PUSCH transmission. In an example, an eNode-B may transmit the DCI message during a fixed time window.

Figure 5:
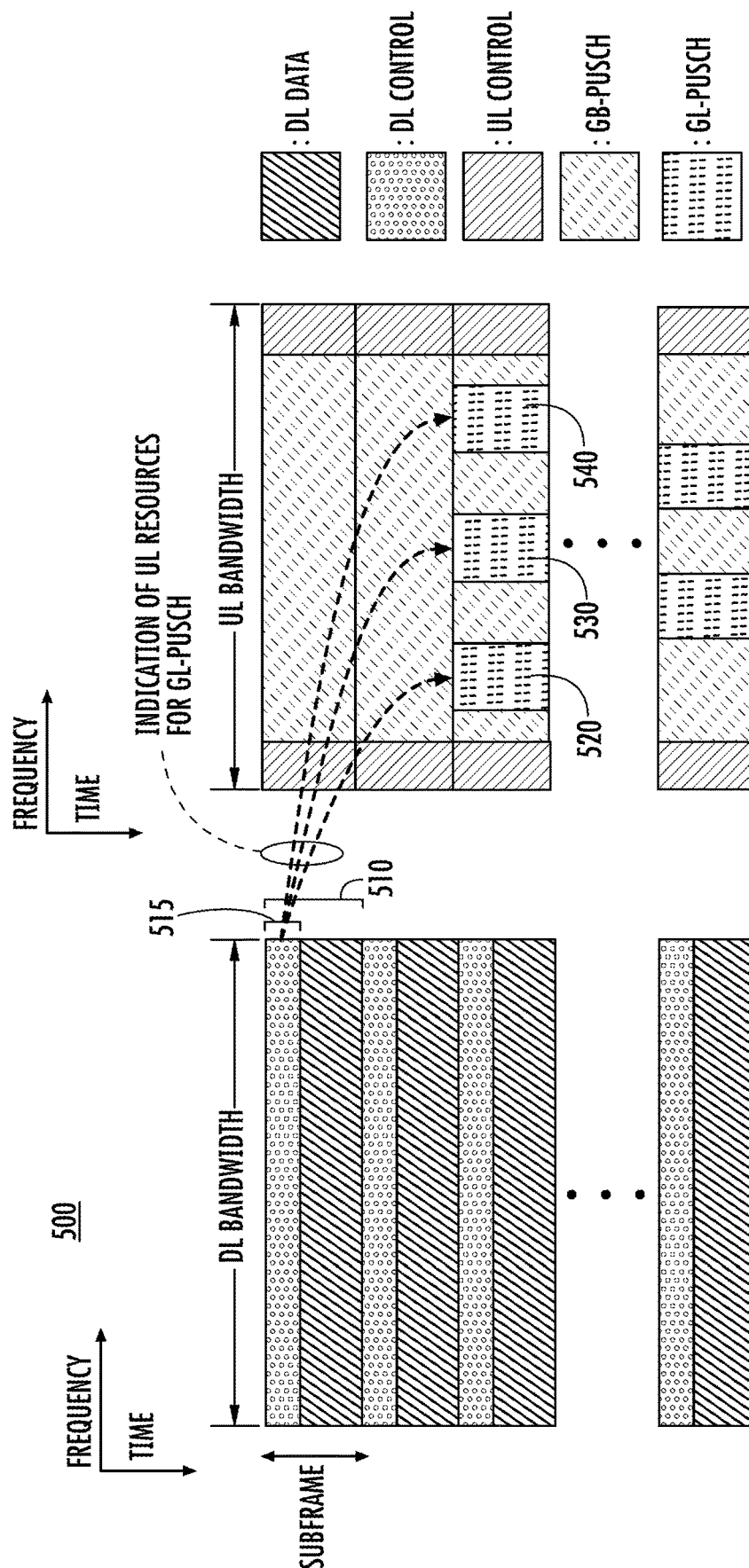
FIG. 5 is a resource allocation diagram of an example of a dynamic indication of a UL resource grant for grant-less Physical Uplink Shared Channel (GL-PUSCH) transmission.

FIG. 5 is a resource allocation diagram of an example of a dynamic indication of a UL resource grant for GL-PUSCH transmission. As shown in resource diagram 500, a WTRU, which receives the common uplink grant for GL-PUSCH transmission, may determine one or more GL-PUSCH resources granted for GL-PUSCH transmission, 520, 530, 540, if the WTRU has data traffic to send using a GL-PUSCH resource. The WTRU may receive the common uplink grant for GL-PUSCH transmission in a DL control region 515 in subframe 510. The data traffic to send using the GL-PUSCH resource may be the second type of data traffic, for example, mMTC. The common uplink grant may be signaled, transmitted, and/or carried in a DCI message which may be monitored by the WTRU in a common search space. The DCI message may be located in DL control region 515. The common search space may be monitored by WTRUs which may be configured or determined to use GL-PUSCH transmission. In an example, the DCI message may be a common DCI message. In a further example, the DCI message may include a subset of the set of GL-PUSCH resources.

In an example, if the WTRU successfully receives the DCI message with an indication of a presence of at least a subset of the set of GL-PUSCH resources, the WTRU may then select one or more GL-PUSCH resources from the subset. For example, the WTRU may select GL-PUSCH frequency resources, GL-PUSCH time resources or both. Further, the WTRU may select a time period within the fixed time window. The WTRU may then transmit, and the eNode-B may receive, data on a GL-PUSCH using the selected GL-PUSCH resources during the selected time period.

In an example, the WTRU may select the GL-PUSCH frequency resources based on a random determination. In a further example, the WTRU may determine the selection of the GL-PUSCH frequency resources based on a WTRU-ID.

In an additional example, the WTRU may select the time period based on a random determination. In another example, the WTRU may determine the selection of the time period based on a WTRU-ID.

Examples of resource sharing between a GL-PUSCH and a GB-PUSCH are provided herein. In an example, one or more GL-PUSCH resources may be used, for example, by the WTRU, for GB-PUSCH transmission. For example, one or more GL-PUSCH resources may be configured by an eNode-B and the configured one or more GL-PUSCH resources may be scheduled for GB-PUSCH transmission. In this case, a GL-PUSCH resource and a GB-PUSCH resource may collide in a same resource which may result in performance degradation.

In another example which may reduce such degradation, resource element (RE) muting of GB-PUSCH for dynamically configurable GL-PUSCH resources may be used. For example, a WTRU may transmit a GB-PUSCH using the scheduled resources which may collide with GL-PUSCH resources if the GL-PUSCH resources are inactive. A WTRU may mute (for example, puncture or rate-match around) the GB-PUSCH resources which may collide with GL-PUSCH resources if the GL-PUSCH resources are active. A GL-PUSCH resource for which a WTRU received a presence indication may be referred to as an active GL-PUSCH resource and a GL-PUSCH resource for which a WTRU did not receive a presence indication may be referred to as an inactive GL-PUSCH resource for a time unit. The time unit may include at least one of several types of time units, such as, for example, a slot, a set of slots, a subframe, a set of subframes, a TTI, a radio frame, and the like.

In an example case, the presence of GL-PUSCH resources may be indicated for a time unit, wherein the time unit may include at least one of a slot, a set of slots, a subframe, a set of subframes, a TTI, and a radio frame. The number of slots, subframes, and/or TTIs for a time unit may be configured in a cell-specific or a WTRU-specific manner.

In an additional example, the presence of GL-PUSCH resources may indicate a subset of GL-PUSCH resources activated for the associated time unit. A WTRU may puncture or rate-match around the scheduled GB-PUSCH resources which may collide with an active GL-PUSCH resource only. A WTRU may transmit a GB-PUSCH transmission on the GB-PUSCH resources which may collide with an inactive GL-PUSCH resource.

In a further example, a WTRU may monitor a common DCI message which may indicate a presence of GL-PUSCH resources even though the WTRU may not be configured for GL-PUSCH transmission. The common DCI message may be monitored in a common search space with an RNTI which may be used for a GL-PUSCH presence indication, for example, a GL-RNTI.

In another example, a WTRU may receive a presence indication in the DCI message used for GB-PUSCH transmission. For example, a WTRU may receive a DCI message for GB-PUSCH transmission and the DCI message may include the presence indication of a GL-PUSCH resource. One or more sets of GL-PUSCH resources may be configured and at least one of the configured sets of GL-PUSCH resources may be indicated as an active GL-PUSCH resource in the DCI message.

In a further example, the status (for example, active or inactive) of a GL-PUSCH resource may be indicated implicitly or explicitly. For example, the status (for example, active or inactive) of a GL-PUSCH resource may be determined implicitly based on one or more system parameters which may include at least one of cell-ID, subframe number, slot number, radio frame number, and numerology (for example, subcarrier spacing, cyclic prefix (CP) length, and the like).

The status (for example, active or inactive) of a GL-PUSCH resource may be indicated explicitly in a DCI message.

In another example, a GB-PUSCH resource, which may collide with an active GL-PUSCH resource, may be punctured or rate-matched around if the GB-PUSCH resource has a lower priority than the GL-PUSCH resource. For example, a data RE of a GB-PUSCH resource may have a higher priority than a data RE of a GL-PUSCH resource, and a data RE of a GB-PUSCH resource may have a lower priority than a reference signal of a GL-PUSCH resource. Therefore, the GB-PUSCH data RE may be punctured or rate-matched around the reference signal of the active GL-PUSCH resource.

In addition, a GB-PUSCH data RE may be muted (for example, punctured or rate-matched around) if it collides with one or more higher priority GL-PUSCH REs which may include at least one of a DMRS and Uplink control information (UCI). With respect to DMRS, the DMRS pattern (for example, time/frequency locations) for GB-PUSCH may be different from that for GL-PUSCH. With respect to UCI, a GL-PUSCH may include a control information which may be a higher priority than GL-PUSCH data REs.

In an example solution, a listen before talk (LBT) technique may be a monitoring technique used in radio communications whereby a radio transmitter first senses its radio environment before it starts a transmission. An LBT technique may be used for GL-PUSCH transmission in order to reduce a collision between a GL-PUSCH and a GB-PUSCH. For example, a WTRU may be required to check or sense a channel's use of GL-PUSCH resources before it may transmit a GL-PUSCH on a configured GL-PUSCH resource.

A GL-PUSCH transmission with LBT may be referred to as a Type-1 GL-PUSCH and a GL-PUSCH transmission without LBT may be referred to as a Type-2 GL-PUSCH.

A WTRU may be configured with a Type-1 GL-PUSCH or a Type-2 GL-PUSCH. Type-1 GL-PUSCH or Type-2 GL-PUSCH may be determined based on at least one of a WTRU-specific configuration (for example, using a WTRU-specific RRC), a cell-specific configuration (for example, using a broadcasting channel), and/or a resource-specific configuration (for example, PRB level).

A first one or more symbols in a GL-PUSCH resource may be used for sensing the channel use (for example, channel sensing) and/or switching a time from sensing a channel to performing a GL-PUSCH transmission. For example, during sensing of the channel use, a WTRU may measure a signal strength in a GL-PUSCH resource and, if the signal strength is higher than a predefined threshold, the WTRU may drop GL-PUSCH transmission. Otherwise, the WTRU may transmit a GL-PUSCH transmission.

Additionally or alternatively, a WTRU may perform channel sensing per PRB-level and any detected unused PRB within GL-PUSCH resources may be used for a GL-PUSCH transmission. Additionally or alternatively, a WTRU may perform channel sensing per subframe-level and, if a signal strength measured in a GL-PUSCH resource (or GL-PUSCH resources) is higher than a predefined threshold, the WTRU may drop GL-PUSCH transmission and wait until next GL-PUSCH resources are available.

In another example solution, one or more orthogonal reference signals may be used between a GL-PUSCH and a GB-PUSCH. For example, a first set of orthogonal reference signals may be reserved, configured, or allocated for GL-PUSCH transmission and a second set of orthogonal reference signals may be used for GB-PUSCH transmission, where the first set of orthogonal reference signals and the second set of orthogonal reference signals may be mutually exclusive.

In an example, a set of orthogonal reference signals may be used in a cell. Further, a subset of the set of orthogonal reference signals may be configured for GL-PUSCH transmission.

In a further example, a WTRU may determine one or more orthogonal reference signals within a configured subset of the orthogonal reference signals for a GL-PUSCH transmission. The one or more orthogonal reference signals may, for example, be determined based on at least one of WTRU parameters (for example, a WTRU-ID), cell-specific parameters (for example, a cell-ID), and a GL-PUSCH resource index.

In another example solution, a GB-PUSCH structure may be adapted according to the PUSCH resource type. The PUSCH resource type may include, for example, a GB-PUSCH resource type or a GL-PUSCH resource type. For example, one or more GB-PUSCH types may be used and each GB-PUSCH type may have a different resource structure, or a GB-PUSCH structure, based on the resource type where a GB-PUSCH may be transmitted. For example, a first GB-PUSCH type, for example, a first GB-PUSCH structure, may include a data resource only and a second GB-PUSCH type, for example, a second GB-PUSCH structure, may include muted RE resources, such that the first GB-PUSCH type may be used for a PRB which may not be configured as a GL-PUSCH resource and the second GB-PUSCH type may be used for a PRB which may be configured as a GL-PUSCH resource. The muted REs in a second GB-PUSCH type may be located on the REs used for a preamble and/or control resources for GL-PUSCH transmission.

Figure 6:
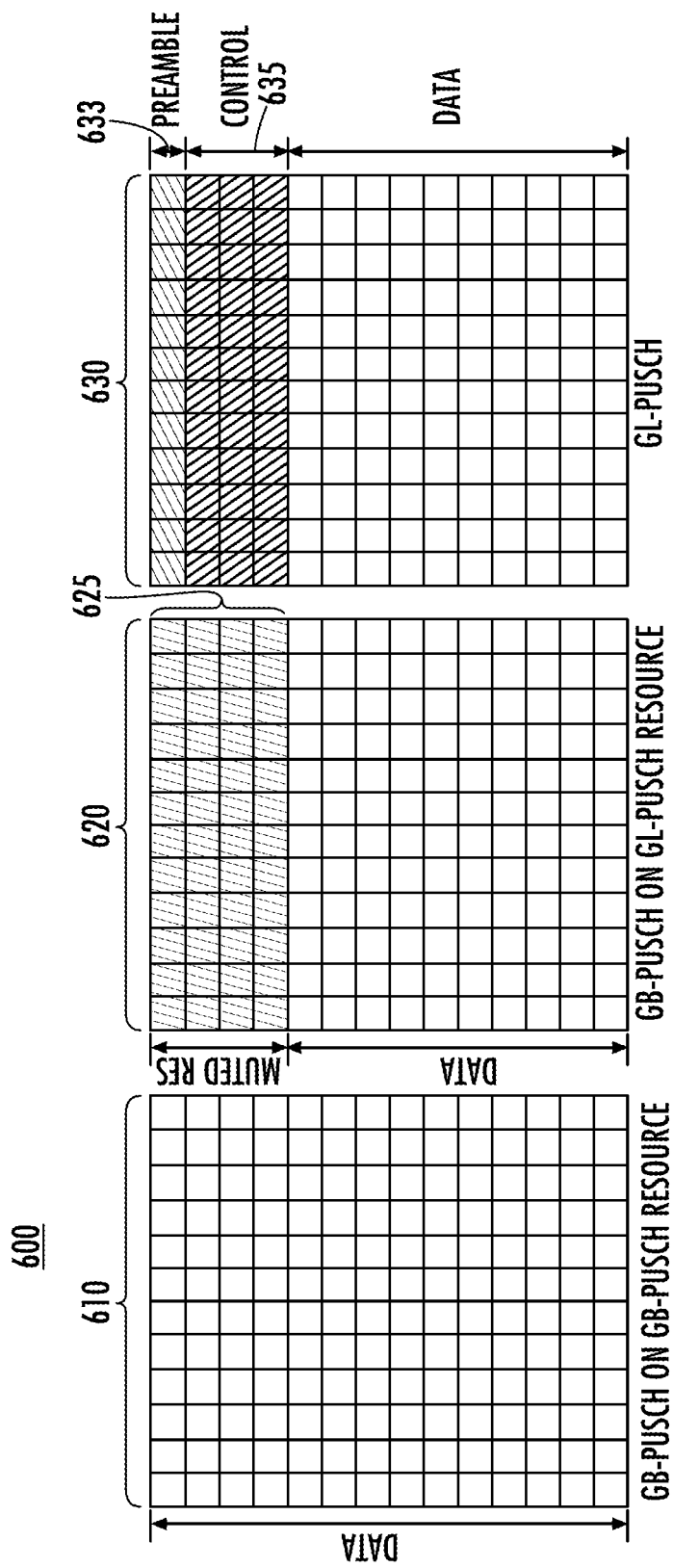
FIG. 6 is a resource allocation diagram of an example of different grant-based Physical Uplink Shared Channel (GB-PUSCH) resource types according to the Physical Uplink Shared Channel (PUSCH) resource type.

FIG. 6 a resource allocation diagram of an example of different GB-PUSCH types according to the PUSCH resource type. As shown in an example in resource diagram 600, a first GB-PUSCH type 610 for transmitting on a GB-PUSCH resource may include a data resource only and a second GB-PUSCH type 620 for transmitting on a GL-PUSCH resource may include muted RE resources 625. A data resource may include at least one of data REs and reference signal REs. A muted resource may be located on the REs used for preamble and control information. For example, muted RE resources 625 of the second GB-PUSCH type 620 may be located on the REs for preamble 633 and control information 635 on GL-PUSCH resource type 630.

Examples of HARQ operation for grant-less UL transmission are provided herein. In an example, for a GL-PUSCH transmission, an associated HARQ-ACK (for example, ACK, negative ACK (NACK), and/or discontinuous transmission (DTX)) may be monitored or received by a WTRU. The associated HARQ-ACK for a GL-PUSCH transmission may be transmitted via a DL HARQ-ACK channel, wherein the DL HARQ-ACK channel may be at least one of following: a HARQ-ACK physical channel which may be used for HARQ-ACK transmission only, a DCI message which may carry one or more HARQ-ACKs for one or more GL-PUSCH transmissions, and/or the type of HARQ-ACK channel (for example, a HARQ-ACK physical channel or a common DCI message) may be determined based on uplink data traffic type.

In an example, a HARQ-ACK physical channel may be used for HARQ-ACK transmission only. The HARQ-ACK physical channel may be configured with a set of HARQ-ACK resources and a HARQ-ACK resource may be may be determined for a GL-PUSCH transmission based on at least one of time and/or frequency resource of the GL-PUSCH transmission, WTRU-ID, and/or subframe (and/or radio frame) number.

In a further example, a DCI message may carry one or more HARQ-ACKs for one or more GL-PUSCH transmission. A certain RNTI may be used for the DCI message, wherein the RNTI may be determined based on at least one of time and/or frequency resource of the GL-PUSCH transmission, WTRU-ID, and/or subframe (and/or radio frame) number. The DCI message may be monitored or received in a downlink control channel region.

In an additional example, the type of HARQ-ACK channel (for example, HARQ-ACK physical channel or a common DCI message) may be determined based on an uplink data traffic type. For example, a first HARQ-ACK channel (for example, a HARQ-ACK physical channel) may be used for a first uplink data traffic type (for example, URLLC) and a second HARQ-ACK channel (for example, a common DCI message) may be used for a second uplink data traffic type (for example, mMTC).

Figure 7:
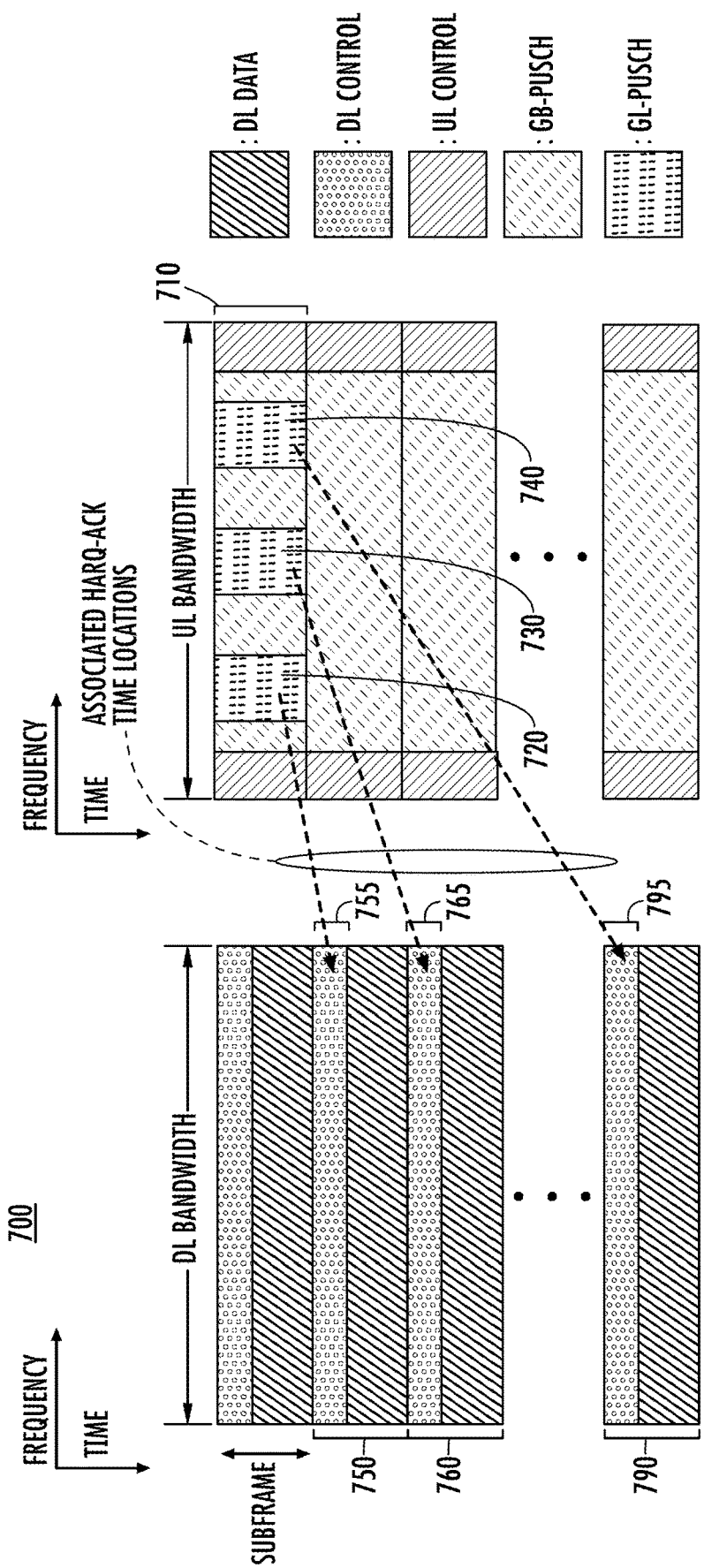
FIG. 7 is a resource allocation diagram of an example of hybrid automatic repeat request acknowledgement (HARQ-ACK) timing based on one or more associated GL-PUSCH frequency locations.

FIG. 7 is a resource allocation diagram of an example of HARQ-ACK timing based on one or more associated GL-PUSCH frequency locations. In an example shown in resource diagram 700, the time location of the HARQ-ACK transmission for a GL-PUSCH transmission may be determined based on a frequency location of a GL-PUSCH resource used. For example, a WTRU may transmit a GL-PUSCH transmission in a subframe n. Further, the WTRU may assume, receive, and/or monitor the associated HARQ-ACK transmission in the subframe n+k, wherein the k may be determined based on the frequency location of the GL-PUSCH transmission.

As shown in FIG. 7, the WTRU may transmit GL-PUSCH transmissions 720, 730, 740 during subframe 710. A eNode-B may likewise receive the GL-PUSCH transmissions 720, 730, 740. The timing locations for the HARK-ACKs associated with each GL-PUSCH transmission may be determined by the frequency locations of each GL-PUSCH transmission. For example, HARQ-ACK associated with GL-PUSCH transmission 720 may be transmitted by the eNode-B and received by the WTRU in control region 755 of subframe 750 based on the frequency location of GL-PUSCH transmission 720. Further, HARQ-ACK associated with GL-PUSCH transmission 730 may be transmitted by the eNode-B and received by the WTRU in control region 765 of subframe 760 based on the frequency location of GL-PUSCH transmission 730 and HARQ-ACK associated with GL-PUSCH transmission 740 may be transmitted by the eNode-B and received by the WTRU in control region 795 of subframe 790 based on the frequency location of GL-PUSCH transmission 740.

As a further example, the WTRU may transmit GL-PUSCH transmissions 720, 730, 740 using GL-PUSCH frequency resources during subframe 710. The WTRU may then determine a time location for reception of HARQ-ACK associated with the GL-PUSCH based on the GL-PUSCH frequency resources used to transmit GL-PUSCH transmissions 720, 730, 740. The WTRU may then monitor for the reception of HARQ-ACK reception during the determined time location. In an example, the determination of the time location may be based on a GL-PUSCH resource index.

In an example, if more than one GL-PUSCH resource is used to transmit GL-PUSCH transmissions, the first GL-PUSCH (for example, GL-PUSCH resource with a lowest PRB index) may be used to determine a HARQ-ACK time location. Alternatively or additionally, the first GL-PUSCH resource index may be used to determine the HARQ-ACK time location.

In addition, k may be same for all frequency locations of the GL-PUSCH transmissions if GL-PUSCH resources are configured, or used in all subframes (or TTIs). Also, k may be different if a subset of subframes (or TTIs) contains GL-PUSCH resources.

In another example, a time window may be used for monitoring, or reception of the HARQ-ACK transmission associated with a GL-PUSCH transmission. For example, a WTRU may transmit a GL-PUSCH transmission in a subframe n and the WTRU may monitor or receive the corresponding HARQ-ACK for a time window (for example, a HARQ-ACK time window) starting from subframe n+k1 and ending at subframe n+k2, where k1 and k2 are positive integers and satisfy k1<k2.

In an example, k1 may be a fixed number (for example, k1=4) and k2 may be determined based on at least one of following. For example, k2 may be determined from a predefined number (for example, k2=8). In another example, k2 may be determined by higher layer signaling. In a further example, k2 may be determined by a type of uplink data traffic. For example, k2=k1 if a first uplink data traffic is used (for example, URLLC), and k2=8 if a second uplink data traffic is used (for example, mMTC). In an additional example, k2 may be determined by a dynamic indication from the common DCI message which may be used for the indication of GL-PUSCH resources.

In another example, a common DCI message may be used for one or more HARQ-ACKs and the DCI message may be monitored within a time window. The RNTI may be determined based on a time/frequency location of the GL-PUSCH transmission and a WTRU may monitor the common DCI message with the determined RNTI within the time window.

In a further example, if a WTRU fails to receive the common DCI message (which may be a DCI message used, for example, for an associated HARQ-ACK) in a time window, the WTRU may retransmit the GL-PUSCH transmission. The retransmission timing may be based on the last subframe index within the time window. The time location of the GL-PUSCH retransmission may be determined based on the UL data traffic type for the GL-PUSCH retransmission. For example, if the last subframe of the time window is the subframe n, a WTRU may retransmit a GL-PUSCH transmission in the earliest subframe which may contain GL-PUSCH resources after the subframe n+j, where j may be a positive integer number and may be determined based on the UL data traffic type.

In an example, an uplink transmission power for a GL-PUSCH retransmission or retransmission may be determined based on a NACK or DTX. For example, the uplink transmission power may be increased by Δoffset if a WTRU fails to receive an HARQ-ACK, while the same uplink transmission power may be used if a WTRU received a NACK. In an uplink power control formula, an offset value to increase the transmission power may be present if a WTRU fails to receive HARQ-ACK in a time window (for example, HARQ-ACK time window).

In another example, a redundancy version of a GL-PUSCH transmission or retransmission may be determined based on a NACK or DTX. For example, a WTRU may use a first redundancy version of a GL-PUSCH if the WTRU received DTX (for example, a WTRU fails to receive an associated HARQ-ACK) and the WTRU may use a second redundancy version of a GL-PUSCH if the WTRU received a NACK. The first redundancy version may be the same redundancy version from the previous transmission, for example, the first transmission or initial transmission. The second redundancy version may be a different redundancy version from the previous transmission. The second redundancy version, or redundancy version index, may be known to the receiver, which may be, for example, an eNode-B.

Figure 8:
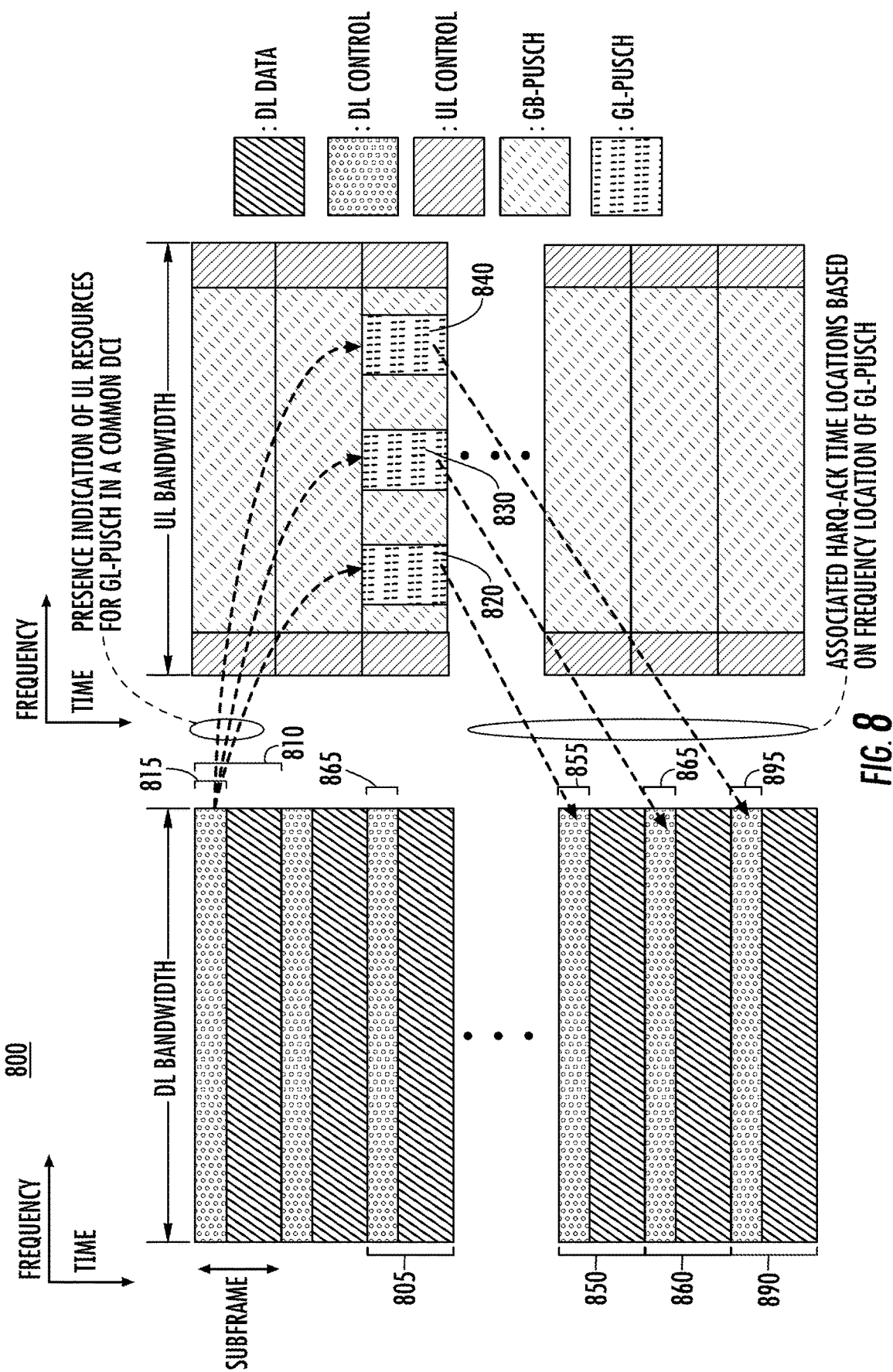
FIG. 8 is resource allocation diagram of an example of dynamic GL-PUSCH resource allocation and its associated HARQ-ACK timing based on one or more GL-PUSCH frequency locations.

FIG. 8 is resource allocation diagram of an example of dynamic GL-PUSCH resource allocation and its associated HARQ-ACK timing based on one or more GL-PUSCH frequency locations. As shown in an example in resource diagram 800, a presence of one or more GL-PUSCH resources in a subframe (or slot, TTI or the like) may be indicated using a common DCI message and the associated HARQ-ACK timing may be determined based on the frequency location of the one or more GL-PUSCH resource.

In an example, an eNode-B may transmit and the WTRU may receive a configuration of a set of GL-PUSCH resources. The configuration of a set of GL-PUSCH resources may include GL-PUSCH frequency resources, GL-PUSCH time resources or both. The WTRU may then monitor for a DCI message including an indication of a presence of at least a subset of the set of GL-PUSCH resources. In an example, the WTRU may monitor for the DCI message during a fixed time window. In an example, the fixed time window may be a first fixed time window. The eNode-B may transmit the DCI message during a fixed time window.

For example, a WTRU, may receive a common uplink grant for GL-PUSCH transmission, and may determine one or more GL-PUSCH resources granted for GL-PUSCH transmissions 820, 830, 840, if the WTRU has data traffic to send using a GL-PUSCH resource. The WTRU may receive the common uplink grant for GL-PUSCH transmission in a DL control region 815 in subframe 810. The common uplink grant may be signaled, transmitted, and/or carried in a DCI message which may be monitored by the WTRU in a common search space. The DCI message may be located in DL control region 815. The common search space may be monitored by WTRUs which may be configured or determined to use GL-PUSCH transmission. In an example, the DCI message may be a common DCI message. In a further example, the DCI message may include a subset of the set of GL-PUSCH resources.

If the WTRU successfully receives the DCI message with an indication of a presence of at least a subset of the set of GL-PUSCH resources, the WTRU may then select one or more GL-PUSCH resources from the subset. For example, the WTRU may select GL-PUSCH frequency resources, GL-PUSCH time resources or both. Further, the WTRU may select a time period within the fixed time window. In an example, this fixed time window may be a second fixed time window. In a further example, the first fixed time window may be different from the second fixed time window. In another example, the first fixed time window may be the same as the second fixed time window. The WTRU may then transmit, and the eNode-B may receive, data on a GL-PUSCH using the selected GL-PUSCH resources during the selected time period.

In an example, the WTRU may select the GL-PUSCH frequency resources based on a random determination. In a further example, the WTRU may determine the selection of the GL-PUSCH frequency resources based on a WTRU-ID.

In an additional example, the WTRU may select the time period based on a random determination. In another example, the WTRU may determine the selection of the time period based on a WTRU-ID.

As a further example, the WTRU may transmit GL-PUSCH transmissions 820, 830, 840 using selected GL-PUSCH frequency resources during subframe 805, which may be the selected time period. The WTRU may then determine a time location for reception of HARQ-ACK associated with the GL-PUSCH based on the selected GL-PUSCH frequency resources. The WTRU may then monitor for the reception of HARQ-ACK reception during the determined time location. In an example, the determination of the time location may be based on a GL-PUSCH resource index.

Accordingly, the timing locations for the HARK-ACKs associated with each GL-PUSCH may be determined by the frequency locations of each GL-PUSCH. For example, HARQ-ACK associated with GL-PUSCH 820 may be transmitted by the eNode-B and received by the WTRU in control region 855 of subframe 850 based on the frequency location of GL-PUSCH 820. Further, HARQ-ACK associated with GL-PUSCH 830 may be transmitted by the eNode-B and received by the WTRU in control region 865 of subframe 860 based on the frequency location of GL-PUSCH 830 and HARQ-ACK associated with GL-PUSCH 840 may be transmitted by the eNode-B and received by the WTRU in control region 895 of subframe 890 based on the frequency location of GL-PUSCH 840.

The use of time multiplexed HARQ-ACK transmission based on a frequency location of the GL-PUSCH resource may be configured via a higher layer signaling. For example, a WTRU may be configured to use time multiplexed HARQ-ACK transmissions or the WTRU may be configured to use the same time location for HARQ-ACK transmissions irrespective of the one or more frequency location GL-PUSCH resources selected or determined by the WTRU.

The use of time multiplexed HARQ-ACK transmission may be determined based on the number of GL-PUSCH resources configured via a higher layer signaling. For example, if the number of GL-PUSCH resources is lower than a predefined threshold, HARQ-ACK time location may be the same for all GL-PUSCH resources. Otherwise, the HARQ-ACK time location may be multiplexed and determined based on the one or more frequency location of GL-PUSCH resources.

Examples of beam selection considerations are provided herein. In GL-PUSCH, a WTRU may start its transmission without an uplink grant. When the WTRU has multiple transmit antennas and/or multiple transmit/receive units, it may use a precoding matrix to precode the signal before it is transmitted. The precoding may be performed in the digital domain, in the analog domain, or a combination of both (hybrid digital/analog).

In an example, the precoding matrix applied to the current signal may be chosen as the precoding matrix that was used for the last transmission before the current transmission. In another example, the WTRU may determine the precoding matrix to be applied to the current transmission by using the last receiver beamforming matrix that was used to receive a downlink signal. For example, the receiver analog beamforming matrix used for the reception of the last downlink transmission may be used to precode the current uplink transmission.

In another example, the WTRU may make some measurements by using various signals transmitted in the downlink and, by using these measurements, compute a precoding matrix to use for the uplink transmission. For example, the WTRU may use the covariance matrix of the received downlink signals as a guide for uplink beamforming of the initial GL-PUSCH transmission.

In another example, the WTRU may repeat the transmission, i.e., transmit the same signal multiple times, where each one of the multiple transmissions of the same signal may be precoded with a different precoding matrix. As an example, each transmission may be beamformed in a different direction such that at the end of the multiple transmissions, the signal may have been received at a wide range of angles, as shown in an example in FIG. 9.

Figure 9:
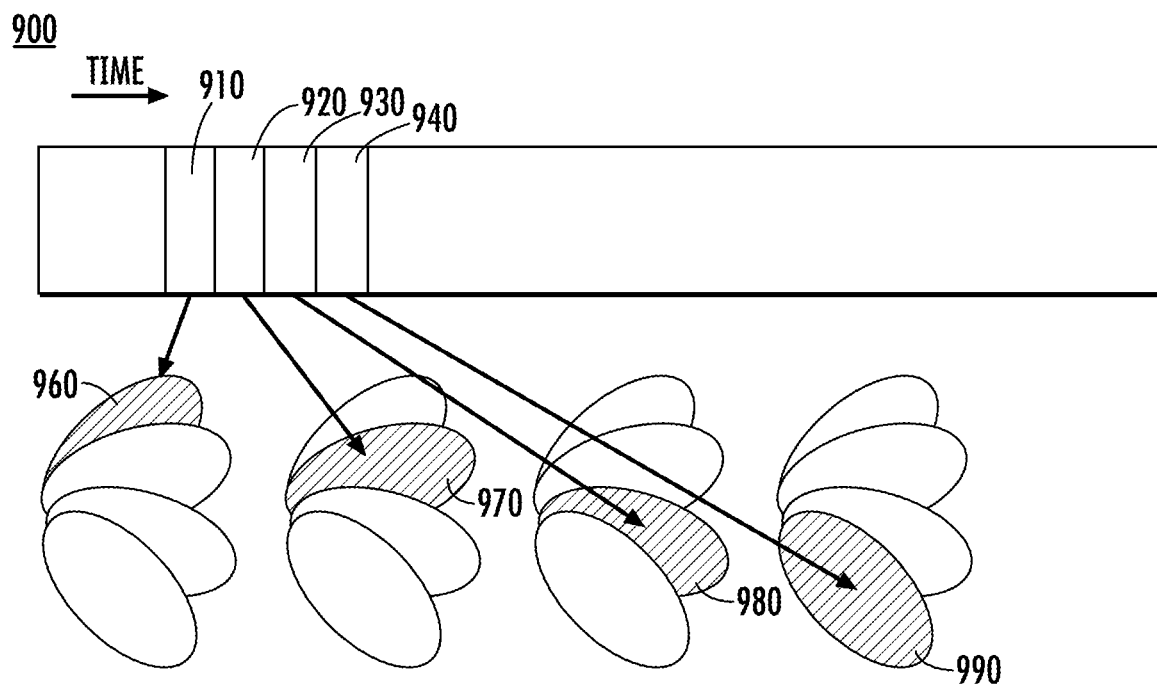
FIG. 9 is a timing and transmission diagram showing an example of a repetition of a signal sent with different beams.

FIG. 9 is a timing and transmission diagram showing an example of a repetition of a signal sent with different beams. In an example shown in timing and transmission diagram 900, a transmission unit of the WTRU may be a waveform symbol (for example, an OFDM symbol, a DFT-s-OFDM symbol, a single carrier symbol, and the like), or a unit that may include several symbols (for example, a slot, a subframe, and the like). In an example, the signal in each transmission unit 910, 920, 930, 940 may be transmitted with a corresponding active beam 960, 970, 980, 990 in a specific direction. The signal transmitted within each transmission unit may have been generated from channel coded data where the whole code-block is transmitted within a transmission unit, such as one of transmission units 910, 920, 930, 940. Alternatively, a part of the code-block may be transmitted within one transmission unit and the whole code-block may be transmitted within two or more transmission units.

In another solution, the WTRU may generate multiple simultaneous beams and the transmission with these beams may be repeated over multiple time intervals. The beams may be multiplied with orthogonal vectors where each coefficient of a vector is applied over one transmission unit.

Figure 10:
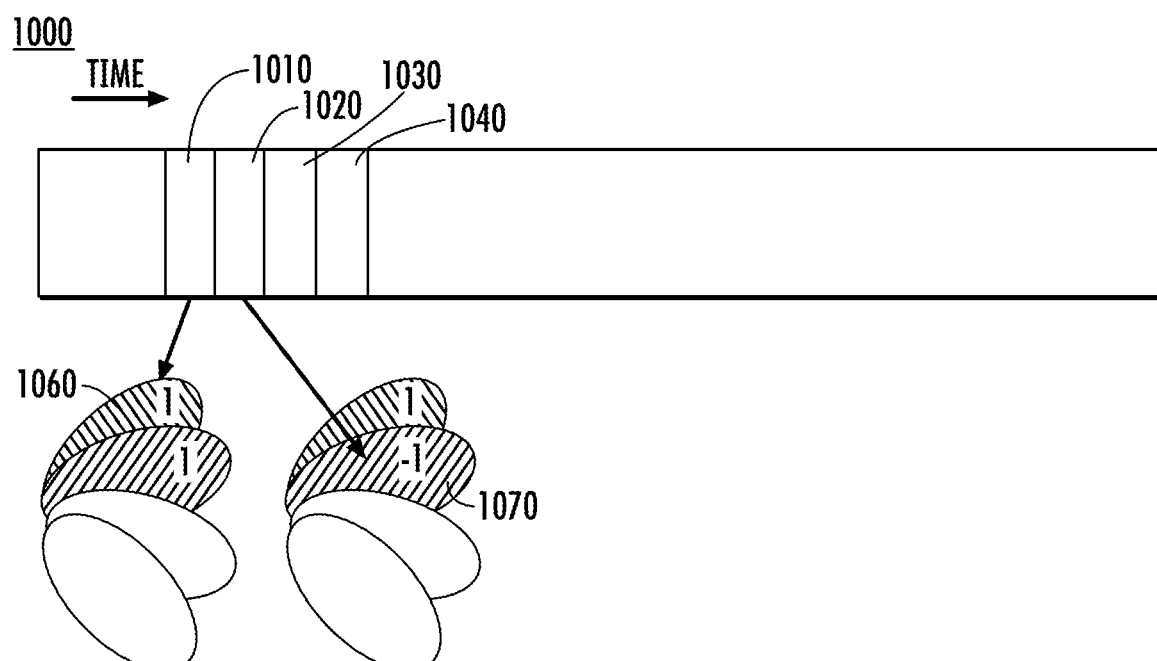
FIG. 10 is a timing and transmission diagram showing an example of a transmission of simultaneous beams.

FIG. 10 is a timing and transmission diagram showing an example of a transmission of simultaneous beams. As an example shown in timing and transmission diagram 1000, a WTRU may generate two beams where the complex coefficients used to multiply the data signal x are given by the vectors $\alpha$ and $\beta$, respectively. The signals transmitted in the two consecutive transmission units 1010, 1020 may then be written as $y_1 = 1\alpha x + 1\beta x$, and $y_2 = 1\alpha x - 1\beta x$, where the orthogonal codes [1 1] and [1 −1] have been used to multiply each of the corresponding beams 1060, 1070 over the two transmission units 1010, 1020. Other pairs of beams may be multiplied with orthogonal cover codes and transmitted in the following transmission units, such as transmission units 1020, 1040. The signal transmitted within each transmission unit 1010, 1020, 1030, 1040 may have been generated from channel coded data where the whole code-block is transmitted within a transmission unit. Alternatively, a part of the code-block may be transmitted within one transmission unit and the whole code-block may be transmitted within two or more transmission units. The precoding/beamforming matrices and/or orthogonal cover codes used to multiply simultaneous beams may be configured by a central controller, such as an eNode-B or a controller within an eNode-B.

Examples of formats of grant-less UL transmissions are provided herein. For example, the GL-PUSCH may use a stand-alone format, or the GL-PUSCH may only contain control and data. For usage scenarios where UL grant-less transmissions may be needed, such as mMTC and/or URLLC, an example mechanism is provided herein for the eNode-B to detect the grant-less transmissions.

WTRUs may be enabled to use UL grant-less transmissions with a pre-assigned set of time-frequency resources for GL-PUSCH transmission. Given the potentially large number of connections and the limited number of resources, the eNode-B may pre-assign a same set of resources to multiple WTRUs, for example, based on the path loss measurements reported by the WTRUs. Some of the UL grant-less transmissions from the WTRUs pre-configured with the same set of resources may overlap, and non-orthogonal MA (NOMA) schemes may be used to separate the individual WTRU transmissions.

In an example, the GL-PUSCH may use a stand-alone format for grant-less UL transmissions. The format may include a preamble field, control field and data field.

Figure 11:
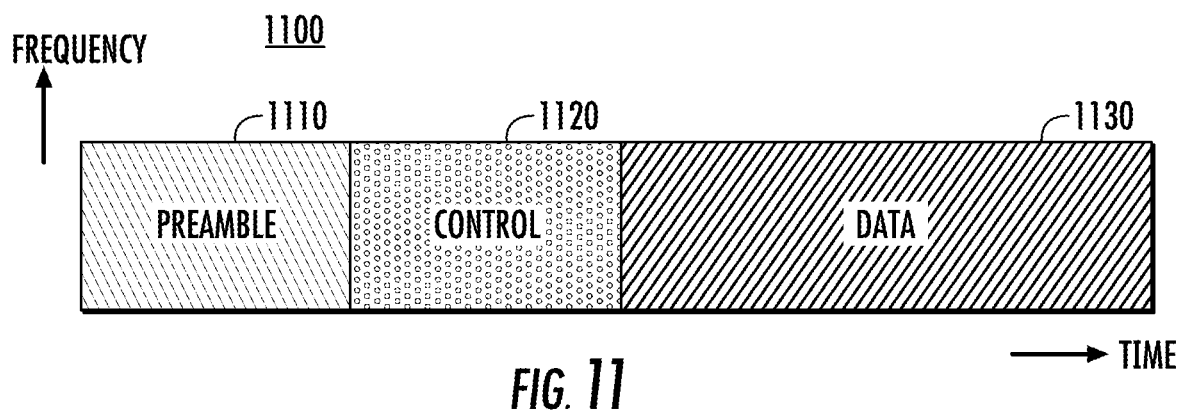
FIG. 11 is a format diagram showing an example of a stand-alone format for GL-PUSCH.

FIG. 11 is a format diagram showing an example of a stand-alone format for GL-PUSCH. As shown in format diagram 1100, the stand-alone transmission format, which may be referred to as Format 1, may include a preamble field 1110, control channel information field 1120, and data field 1130. The preamble field 1110 may enable the eNode-B to detect the presence of UL grant-less transmission, and it may also enable the eNode-B to perform channel estimation. In other words, the preamble field 1110 may be used in lieu of or in addition to reference symbols.

The preambles may use sequences with good correlation properties (for example, Golay sequences), for example, to orthogonalize the WTRU and to enable the channel estimation. For example, preamble field 1110 may use sequences with good correlation properties.

The type of preamble may be configurable during the initial connection setup, for example, based on: a usage scenario (for example, mMTC or URLLC) and/or a NOMA scheme employed in the system. For example, for NOMA schemes that require synchronous access (for example code-domain NOMA), a shorter preamble may be used. Also, for NOMA schemes that may support asynchronous access (for example, where the timing offsets between the WTRUs are larger than the cyclic prefix or guard interval), a longer preamble may be used.

Additionally, the preamble may also be dynamically configured by the WTRU, as a function of the total number of REs pre-assigned for the transmission and the packet size (for example, transport block size (TBS)) to be transmitted. For example, for a small TBS, where the target coding rate may be attained with fewer REs than the pre-assigned number of REs, it may be possible to use a longer preamble, for example, to improve the detection probability and the channel estimation.

The eNode-B may search for a pre-defined set of preambles within the pool of resources pre-assigned for UL grant-less access. Thus, the WTRU may select from a set of possible preamble lengths, to reduce the complexity of the eNode-B searches. For the case where the WTRU may select the preamble, the preamble configuration may be used to convey the WTRU type, or other type information or indication. An example of such an indication is whether the current transmission includes a control channel.

As shown in FIG. 11, the control channel field 1130 for the UL grant-less transmission follows the preamble field 1110, and it may carry information including one or more of the following. For example, the control channel field 1130 may carry information regarding a WTRU identification, such as, for example, a WTRU ID or RNTIs. Further, the control channel field 1130 may carry information regarding a TBS and/or a modulation and coding scheme (MCS) used for the transmission. Also, the control channel field 1130 may carry information regarding whether the current transmission is a single transmission or part of a multiple packet transmission. In addition, the control channel field 1130 may carry information regarding a new data indicator (NDI) configured to signal a new transmission or a re-transmission. Moreover, the control channel field 1130 may carry information regarding other UL feedback information.

In an example, the WTRU identification may be achieved in two stages. In an example stage, a WTRU type may be, for example, carried within the preamble 1110, wherein a determined or selected preamble may implicitly indicate a WTRU type or an explicit indicator may be signaled in the preamble field. In another example stage, a WTRU ID or an RNTI may be, for example, carried by the control channel field 1120.

In another example format of stand-alone transmission for grant-less UL transmissions, which may be referred to as Format 2, the GL-PUSCH may contain control and data fields for grant-less UL transmissions. For example, the GL-PUSCH may only contain control and data fields for grant-less UL transmissions.

Figure 12:
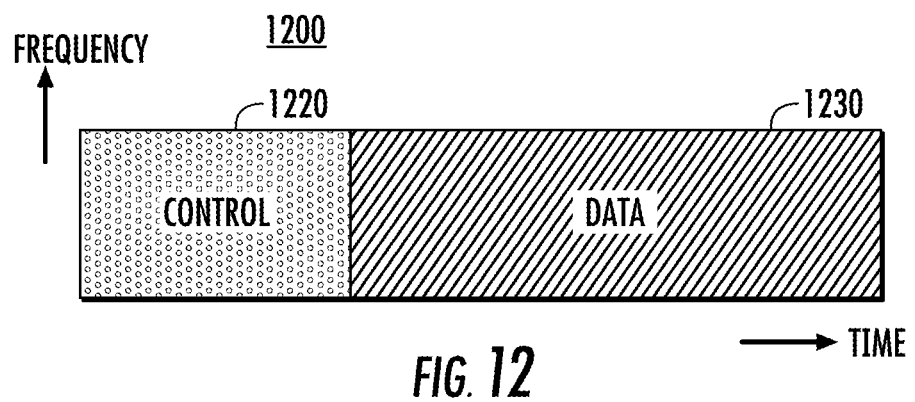
FIG. 12 is a format diagram showing an example of a control and data only format for GL-PUSCH transmission.

FIG. 12 is a format diagram showing an example of a control and data only format for GL-PUSCH transmission. In an example shown in format diagram 1200, the control and data only format may include a control channel information field 1220 and a data field 1230. In an example, when continuous transmissions are needed, for example, when more UL data needs to be transmitted or used, the stand-alone transmission format shown in FIG. 11 may be used such that a preamble field 1110 is included for the first transmission, and then the format in FIG. 12 may be used (i.e., without the preamble field 1110) where subsequent transmissions in back-to-back UL grant-less transmissions may be transmitted or used.

Figure 13:
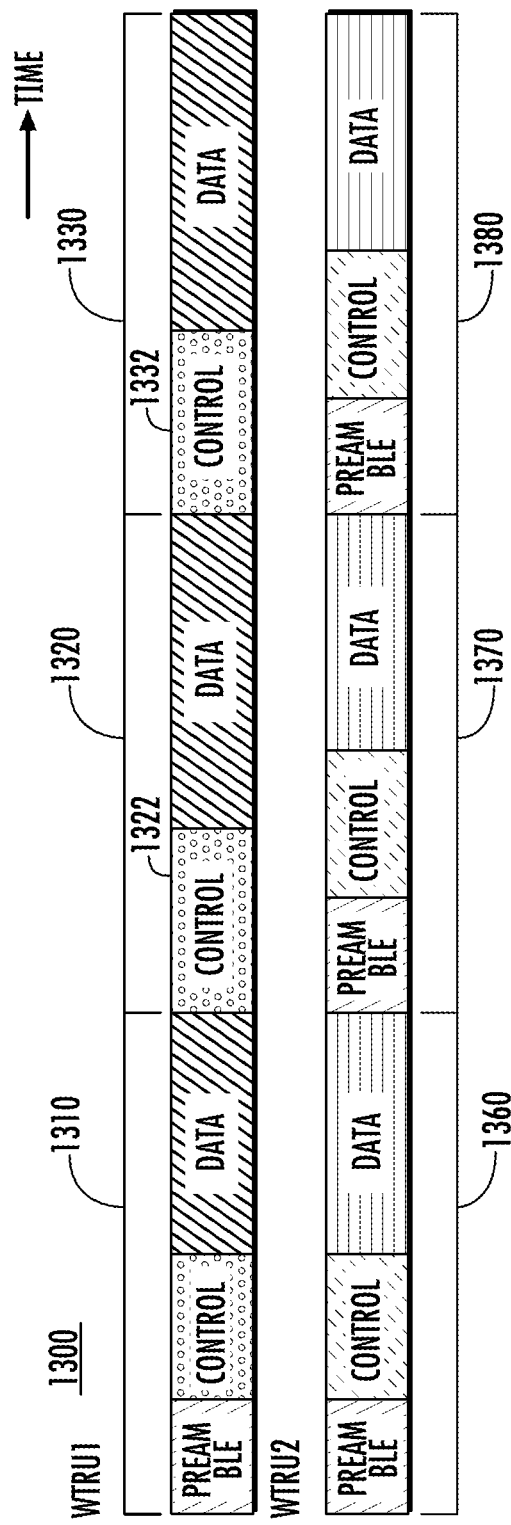
FIG. 13 is a timing diagram showing an example of GL-PUSCH interference scenarios between different formats.

FIG. 13 is timing diagram showing an example of GL-PUSCH interference scenarios between different formats. In an example shown in timing diagram 1300, each transmission 1320, 1330 following the first transmission 1310 may include stand-alone WTRU identification information in the respective control channel field 1322, 1332, for example, to enable the eNode-B to separate overlapping transmissions from different WTRUs, where one WTRU may use a first format, and an overlapping WTRU may use a second format. An example scenario is illustrated in FIG. 13, which shows GL-PUSCH interference scenarios between Format 1 and Format 2. WTRU1 may use Format 2 after the initial transmission, which may be sent using Format 1, and WTRU2 may use Format 1 for an initial transmission as well as further transmissions. In an example, WTRU1 may use a first format, which may be Format 1 and the format shown in FIG. 11 for the initial transmission. Further, WTRU1 may use a second format, which may be Format 2 and the format shown in FIG. 12 for transmissions sent after the initial transmission. Accordingly, WTRU1 may transmit each transmission 1320, 1330 following the first transmission 1310 with a stand-alone WTRU identification information in the respective control channel field 1322, 1332. This stand-alone WTRU identification information may enable the eNode-B to separate overlapping transmissions from WTRU2. WTRU2 may use the first format, which may be format 1 and the format shown in FIG. 11 for an initial transmission as well as further transmissions. In this way, WTRU2 may transmit transmissions 1360, 1370, 1380.

Additionally, in an example, the preambles for Format 1 may use dedicated sub-carriers, for example, to reduce the interference between the preamble of the WTRUs using Format 1, and the control field of the WTRUs using Format 2. The dedicated sub-carriers may be within the pre-assigned resources.

Figure 14:
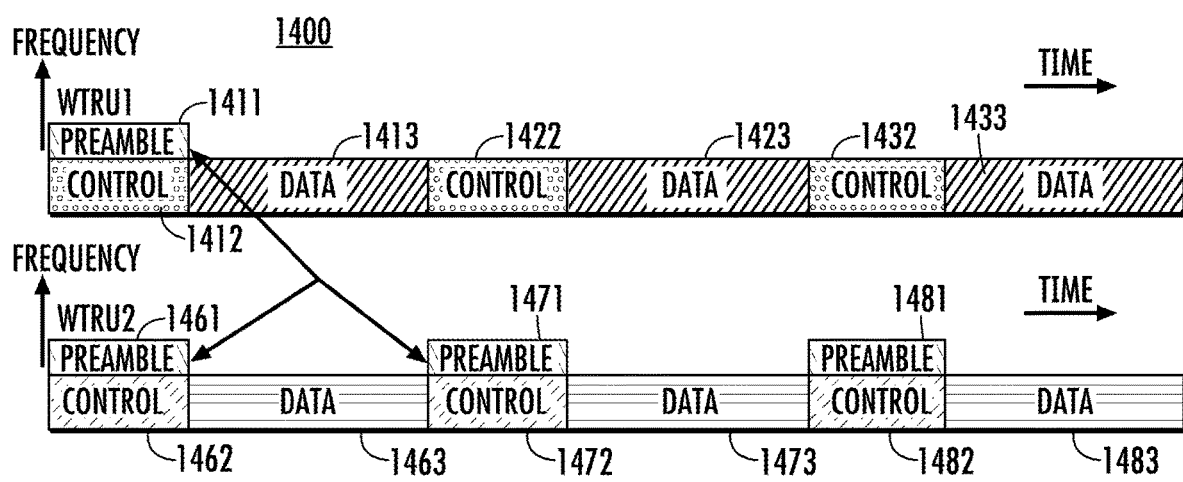
FIG. 14 is a timing diagram showing an example of dedicated subcarriers for GL-PUSCH preambles.

FIG. 14 is a timing diagram showing an example of using dedicated subcarriers for GL-PUSCH preambles. As shown in timing diagram 1400, the preambles 1411, 1461, 1471, 1481 may use dedicated sub-carriers. However, the overlapping control fields 1412, 1422, 1432, 1462, 1472, 1482 and the data fields 1413, 1423, 1433, 1463, 1473, 1483 may lack dedicated sub-carriers.

Examples of grant-less access resource provisioning are provided herein. For example, different types of traffic may have different quality of service (QoS) requirements that may need to be considered. For example, URLLC traffic may need to be prioritized over mMTC traffic. Resource provisioning, such as, for example, by an eNode-B, may consider the QoS requirements of various traffic types. Resource provisioning may include allocating a set of resources, such as, for example, PUSCH resources, for one or more traffic types.

As an example, a set of resources, such as, for example, dedicated resources, may be allocated and/or made available for a traffic or transmission type. In an example, the traffic or transmission type may include URLLC or mMTC traffic or transmissions. The set of resources may be allocated and/or made available exclusively for the traffic or transmission type transmissions. The size of the set of resources may be increased/decreased/reallocated, for example, based on factors such as traffic type, QoS, and/or load. For example, a smaller set of resources may be allocated for mMTC traffic than for URLLC traffic, for example, based on QoS requirements. Resources allocated for URLLC traffic may be reduced, for example, when the load may be decreased.

Collisions on contention based resources may be reduced by random resource selection. For example, an eNode-B may consider a resource set of K resources that may be used by a set of devices or for a type of traffic or transmissions. In an example, the resources may be used for mMTC devices or devices with mMTC traffic or transmissions. The devices may choose a subset of resources within this set of K resources. In an example, the devices may need or use resources for a particular traffic or transmission type. In a further example, the devices may choose randomly. The devices may choose a subset of resources by utilizing a simple multiplicative hashing function that may randomize the starting resource, which may be part of a set of resources that may be contiguous, that a WTRU may utilize for its transmissions. A WTRUs may utilize its C-RNTI, or its WTRU ID such as its IMSI, to perform this hashing.

In another example, an eNode-B may utilize multiple resource sets. An eNode-B may divide K resources into M sets. A subset of devices may be allowed to transmit on a set. The sets may or may not be overlapping. An eNode-B may use a form of load balancing to distribute the WTRUs across the different sets. An eNode-B may utilize downlink L1/Layer 2 (L2) control signals in order to inform a WTRU, or set of WTRUs, which set of resources the WTRU may utilize for transmissions. The L1/L2 control signals may be in a DCI message, in an example.

Resource provisioning may be used in addition to NOMA schemes, for example, to providing an additional dimension of flexibility for the purpose of resource overloading. In an example, the resource provisioning may be dedicated resource provisioning. In a further example, a NOMA scheme may be a power domain NOMA scheme.

Example procedures for UL grant-less transmissions using preambles are provided herein. For UL grant-less transmissions that use preambles, mechanisms may be required to handle potential collisions of MA signatures for the WTRUs that may transmit in the same time-frequency resources, for example, for WTRU power saving purposes. These mechanisms may be used, for example, for the WTRUs to continue the UL data transmission when no collision occurs, or to stop the UL data transmission when collisions may occur.

Figure 15:
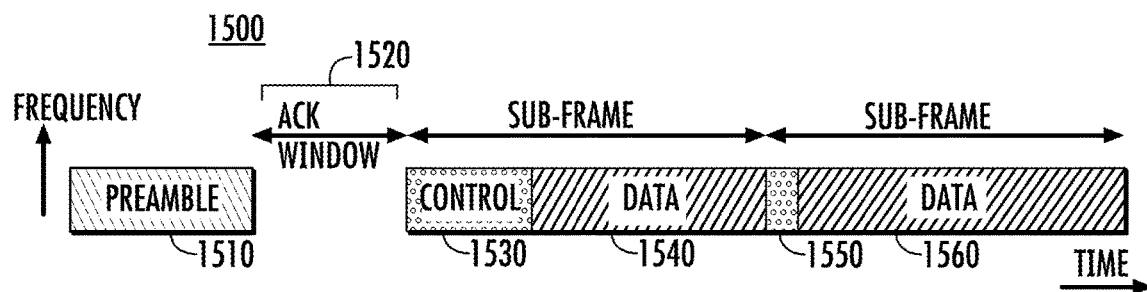
FIG. 15 is a format and timing diagram illustrating an example of UL grant-less transmissions.

FIG. 15 is a format and timing diagram illustrating an example of UL grant-less transmissions. In an example shown in format and timing diagram 1500, the eNode-B may transmit a preamble ACK if it successfully decoded a valid preamble sequence 1510 received from the WTRU. The WTRU, upon receiving the preamble ACK within a valid acknowledgement window 1520, may continue the UL grant-less transmission for control information 1530, 1550 and/or data 1540, 1560.

Figure 16:
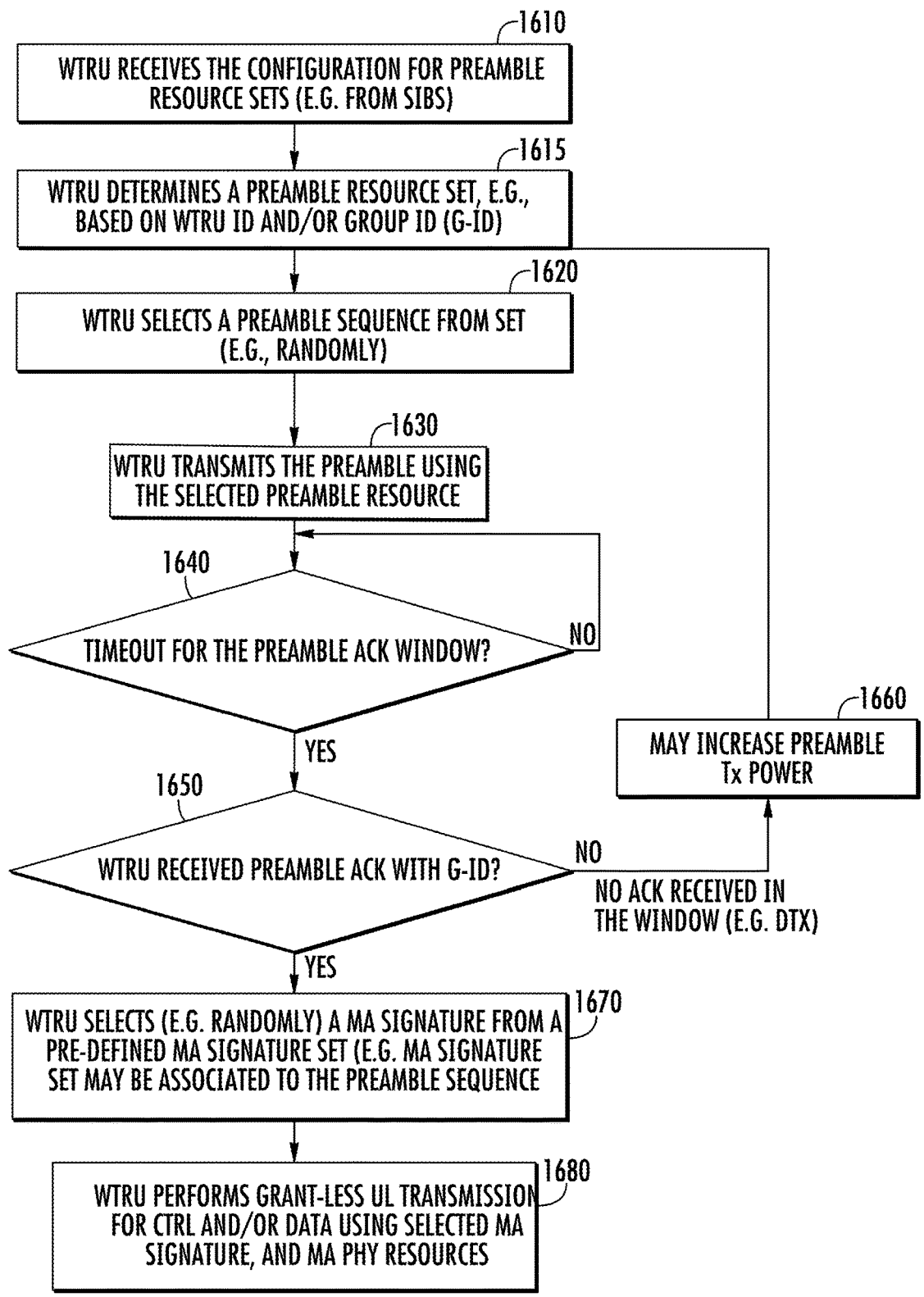
FIG. 16 is a flow diagram illustrating an example procedure for performing UL grant-less transmissions using preambles.

FIG. 16 is a flow diagram illustrating an example procedure for performing UL grant-less transmissions using preambles. In an example shown in flow diagram 1600, the WTRU may receive, determine, and/or decode the configuration of available preamble resource sets from DL system information messages, for example, a SIB 1610. The WTRU may determine a preamble resource set from the available sets and/or a group ID associated with the resource set 1615. In an example, the WTRU may determine a preamble resource set from the available sets based on the WTRU ID, the WTRU category, the traffic type or the like. In a further example, the group ID may be a G_ID. The WTRU may select a preamble sequence from the preamble resource set 1620, and transmit the preamble using the selected preamble sequence 1630. In an example, the WTRU may select the preamble sequence randomly. Further, the WTRU may monitor for a preamble ACK, for example, within a preamble ACK window 1640. If no timeout is reached for the monitoring, the WTRU may continue monitoring. The WTRU may determine if a preamble ACK is received 1650. In an example, the preamble ACK may correspond to the transmitted preamble and/or the preamble ACK may be received with the associated G_ID.

If no preamble ACK is received in the ACK window, the WTRU may perform one or more of the following. The WTRU may discontinue the transmission (DTx). Further, the WTRU may increase the preamble Tx power 1660. Also, the WTRU may select a new preamble sequence from the preamble resource set associated with the same G_ID 1620. The WTRU may re-transmit the grant-less UL preamble using the new parameters 1630. The WTRU may re-transmit the preamble during the next transmission opportunity and/or when the maximum number of re-tries for the preamble transmission is reached. In an example, the maximum number of re-tries may be based on exceeding a count threshold value on a transmission counter. In addition, the WTRU may switch to a low power, or sleep, mode, for example, to save power, and re-start the process after a certain amount of time.

If the WTRU receives a preamble ACK, for example, with the matching G_ID, and/or with a preamble sequence index matching the selected or transmitted preamble sequence, within the valid ACK window, the WTRU may continue with the UL grant-less transmission of control information and/or data. The WTRU may select an MA signature from a pre-defined MA signature set 1670. In an example, the WTRU may select the MA signature randomly. In a further example, the MA signature set may be associated with the preamble sequence. Further, the WTRU may use the selected MA signature to perform grant-less uplink transmission of the UL control information and/or data 1680. The WTRU may also use MA physical layer (PHY) resources for the grant-less uplink transmission. An MA signature may consist of a at least one of a codebook, an interleaver, a spreading and/or scrambling sequence, and/or one or more reference signals or symbols. In the UL control signal, the WTRU may signal its ID (for example a WTRU_ID, or an RNTI), which may be used by the eNode-B, for example, to acknowledge subsequent data transmissions from that particular WTRU.

For the grant-less transmission of the preamble, one or more WTRUs associated with the same G_ID may select the same preamble sequence and a preamble collision may occur. The eNode-B may still correctly detect the preamble, and may transmit a preamble ACK within the valid window, using the G_ID and the index of the preamble sequence. The WTRUs may select the MA signature from the MA signature set. In an example, the WTRUs may select the MA signatures randomly using different random seeds. In an example, by de-coupling the selection of the MA signature from the selection of the preamble sequence, the probability of collisions on the data part of the transmissions may be reduced, while maintaining a reasonably low complexity for the eNode-B preamble detection process. In an example, the low complexity may be maintained due to the limited size of the preamble resource set.

In another example, the WTRU may select a preamble sequence from the preamble resource set, and select the MA signature from the MA signature set. In an example, the WTRU may select a preamble sequence from the preamble resource set randomly. The WTRU may transmit the preamble, which may be a grant-less preamble in an example, using the selected preamble sequence, and continue with the UL control channel transmission immediately following the preamble, using the selected MA signature.

Figure 17:
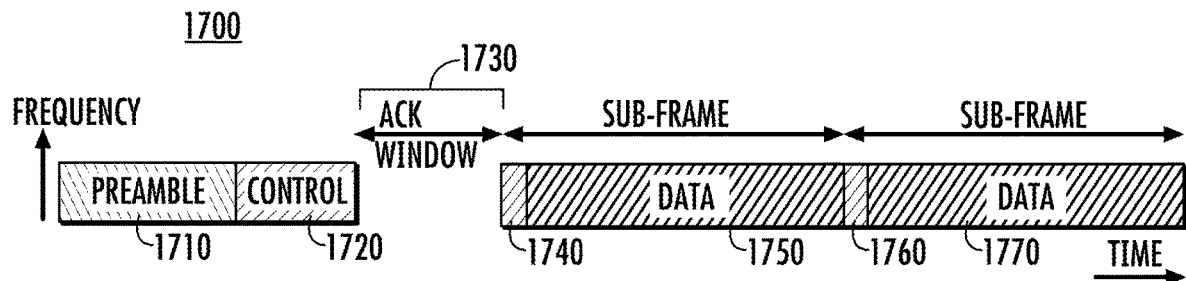
FIG. 17 is a format and timing diagram illustrating another example of a UL grant-less transmission.

FIG. 17 is a format and timing diagram illustrating another example of a UL grant-less transmission. In an example shown in format and timing diagram 1700, the control channel 1720 may carry information to identify the WTRU, for example, an WTRU_ID. After the transmission of the preamble 1710 and the control channel 1720 with control information, the WTRU may then start monitoring for the preamble ACK with the specific WTRU identifier, during the ACK window 1730.

If no preamble ACK with the specific WTRU identifier is received during the valid ACK window 1730, the WTRU may retry the grant-less UL preamble 1710 transmission (with different parameters, as explained above), or may stop the subsequent data transmissions, for example, to save power.

If the eNode-B correctly detects the preamble 1710 and successfully decodes the control channel 1720, then the eNode-B may transmit in the downlink a preamble ACK with the specific WTRU identifier. In this case, the WTRU may proceed with the UL grant-less transmission of the data 1750, 1770, for example, using the MA sequence selected for the control channel 1720, 1740, 1760 transmissions. Alternatively, the control channel 1720 may carry information to signal the index of the MA sequence selected for the grant-less data transmission.

Examples of grant-less transmission acknowledgement and power control are provided herein. A WTRU may make a transmission that may be a grant-less transmission. A transmission may consist of one or more parts. A part of a transmission may include at least one of a preamble, a control part that may include or provide control information, and/or a data part that may include or provide data, for example, a data payload. For example, a transmission may include the parts or part types shown in FIG. 11 or 12. One or more of each of one or more part types (for example, preamble, data, and/or control) may be included in a transmission, for example, as shown in FIGS. 13, 14, 15 and 17.

The parts of a transmission may be in any order and still be consistent with this disclosure. For example, the order may be as shown in FIG. 11 or in FIG. 18.

Figure 18:
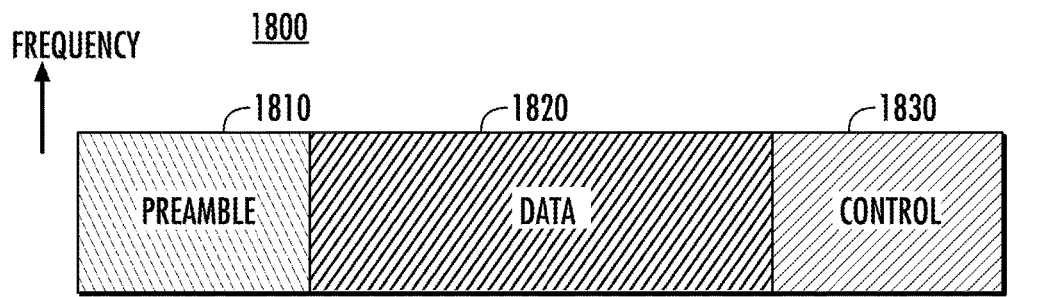
FIG. 18 is a format and timing diagram illustrating an example of a UL grant-less transmission without gaps between parts of the transmission.

FIG. 18 is a format and timing diagram illustrating an example of a UL grant-less transmission without gaps between parts of the transmission. In an example shown in format and timing diagram 1800, a UL grant-less transmission may include a preamble part 1810, followed by a data part 1820, which may be in turn followed by a control part 1830. The UL grant-less transmission may have no gaps between parts 1810, 1820, 1830. As a result, the parts 1810, 1820, 1830 may be contiguous in time.

In another example, multiple parts of a transmission that may be considered to be part of the same transmission or transmission set may or may not be contiguous in time. For example, there may be a time window or time gap between the transmission of parts such as those parts shown in FIGS. 14, 16 and 19.

Figure 19:
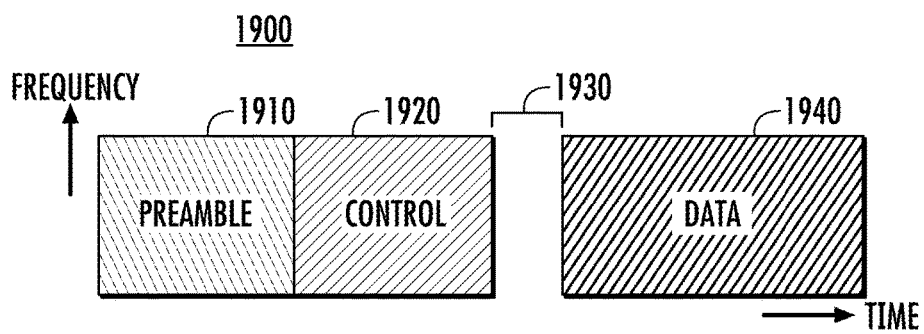
FIG. 19 is a format and timing diagram illustrating an example of a UL grant-less transmission without gaps between parts of the transmission.

FIG. 19 is a format and timing diagram illustrating an example of a UL grant-less transmission without gaps between parts of the transmission. In an example shown in format and timing diagram 1900, a UL grant-less transmission may include a preamble part 1910, followed by a control part 1920, which may be in turn followed by a gap 1930 and then a data part 1940 after the gap. The UL grant-less transmission may therefore have a gap between parts 1920 and 1940. As a result, the parts 1920 and 1940 may not be contiguous in time.

A WTRU may transmit a part of a transmission if the WTRU receives an ACK for another part of the transmission, for example, a preceding part of the transmission. In an example, A WTRU may transmit a part of a transmission only if it receives an ACK for another part of the transmission. Thus, successive parts may transmitted in response to receiving an ACK to a preceding transmitted part, and, more particularly, an immediately preceding transmitted part.

A control part or control information of a transmission may include at least one parameter, for example, a transmission parameter related to another part of the transmission, or a part of another transmission.

For example, control information may include one or more parameters related to a data part of a transmission, and, more particularly, to a subsequent data part of a transmission. For example, a transmission may include at least the control information and the data transmission and, optionally, a preamble.

In an example, control information may be transmitted for a data transmission or a data part of a transmission. Control information may include at least one of the following: time and/or frequency resources, for example, location and/or number of resources, which may be represented by a set of resource blocks (RBs) PRBs, REs, among others; transport block size (TBS); modulation and/or coding scheme; and/or a number of layers used for the transmission.

Any part of a transmission, for example, a control part or a data part may include or provide a WTRU identifier. The WTRU identifier may be a function of a WTRU ID, for example, an IMSI or temporary international mobile subscriber identity (TIMSI). The WTRU identifier may be the WTRU's connection identifier, for example, its C-RNTI. The WTRU identifier may be chosen or determined, for example, randomly, by the WTRU from a pool or set of identifiers that may be configured and/or that may be broadcast. The WTRU identifier may be included explicitly. For example, the WTRU identifier may be represented by an index or a number of bits. The WTRU identifier may be included implicitly. For example, at least part, for example, a CRC, of the transmission part may be masked or scrambled with the WTRU identifier. Thus, information representative of the WTRU, explicitly or implicitly, may be provided by the WTRU.

A WTRU may determine or select a preamble for transmission, for example, from a pool or set of preambles that may be configured. There may be a separate pools or sets of preambles for WTRUs in connected mode, for example, WTRUs with an RRC connection, and WTRUs in idle mode or not in connected mode, for example, WTRUs without an RRC connection.

A preamble may be selected at least according to the configuration of the transmission, where the configuration may include at least one of: the number of parts in the transmission, the types of parts in the transmission, the length of one or more parts in the transmission and the like. In an example, the length of one or more parts in the transmission may be measured in time.

One or more transmission ACKs may be provided, used or both. In an example, the ACKs may be provided by an eNode-B and used by a WTRU. In another example, the ACKs may be provided by a WTRU and used by an eNode-B.

One or more parts of a transmission may be received, for example, by a WTRU, and/or acknowledged, for example, by a network node such as an eNode-B. In an example, each part of a transmission may be acknowledged separately or in a bundle. A WTRU may receive an acknowledgement for one or more parts of a transmission that may be made by the WTRU. In an example, a WTRU may receive an acknowledgement for each of one or more parts of a transmission that may be made by the WTRU.

For example, a WTRU may make a transmission of a preamble, control information, and/or data. The WTRU may receive an ACK for one or more of the preamble, the control information, and/or the data. An ACK and/or a NACK for different parts of a transmission may be provided together or separately.

For example, following a transmission that may comprise one or more transmission parts, a WTRU may monitor for reception of an ACK/NACK. The WTRU may monitor a channel, for example, DL control channel, or resources that may be associated in time and/or frequency with at least one of the parts of the WTRU's transmission. The association may be with at least one of the time, frequency, and/or code of at least one of the parts of the transmission. The WTRU may monitor the channel or resources for the reception of the ACK/NACK, for example, in DL control information, for the WTRU's transmission. In an example, for a transmission of N parts, there may be N indications to indicate ACK or NACK for each of the N parts. In an example, the N indications may be N bits. The N indications may be provided in one transmission by the eNode-B, for example. In an example, the N indications may be provided in one DCI message.

In another example, one indication may be used to indicate an ACK or NACK for multiple parts. For example, there may be one indication to indicate an ACK or NACK for a preamble transmission. There may be one indication to indicate an ACK or NACK for a data part and a control part. Thus, an ACK may indicate that both parts were received successfully. Similarly, an NACK may indicate that at least one of the parts was not received successfully.

In another example, a WTRU may make a transmission comprising a preamble, a data part, and/or a control part, transmitted in iteration. If the preamble is received by the receiver, for example, an eNode-B, the receiver may send an ACK for the preamble. The preamble may enable the receiver to locate one or more other parts of the transmission such as the control part and/or data part. If the receiver successfully receives and/or decodes the control part, the receiver may send an ACK for the control part. If the receiver does not successfully receive and/or decode the control part, it may send a NACK or not send an ACK for the control part. If the receiver successfully receives the control part, the receiver may be able to locate and/or decode the data part. If the receiver successfully receives and/or decodes the data part, the receiver may send an ACK for the data part. If it does not successfully receive and/or decode the data part, it may send a NACK or not send an ACK for the data part.

A transmission power for a part of a transmission that may be made by a WTRU may be determined by the WTRU. In an example, a transmission power for a part of a transmission may be determined separately and/or independently from the determination of the transmission power for another part of a transmission. For example, a preamble power for transmitting a preamble may be determined separately and/or independently from the transmission power for a data part or a control part of a transmission. The transmission power for a data part and a control part of a transmission may be determined together, separately and/or independently.

For example, a WTRU may determine the power of a transmission part, for example, a preamble power, based on a measurement, for example, a pathloss measurement, of a signal such as a reference signal. The WTRU may determine the power for a transmission part, for example, a control part, based on at least one or more parameters of the transmission which may be configured or pre-determined. A WTRU may determine the power for a transmission part, for example, a data part, based on at least one or more parameters of the transmission that may be determined by the WTRU and/or provided, included, or transmitted in the control part.

In another example, the transmission power for a first part of a transmission may be determined based on the power for another part of the transmission. For example, if the WTRU increases the power for one part, for example, a preamble part, it may also increase the power of another part, for example, control and/or data part, and, more particularly, for a subsequent transmission part. The increase in power for a second part may be a function of the increase in power of a first part.

A transmission power, for example, for a grant-less transmission, may be dependent on the time elapsed since a previous transmission that may be granted or grant-less. For example, if the time since a previous transmission is less than a threshold amount of time that may be configured, the WTRU may set the power for a new transmission or part of a new transmission according to a first rule. If the time since a previous transmission is greater than a threshold amount of time that may be configured, the WTRU may set the power for a transmission or part of a transmission according to a second rule.

The first rule may be to do at least one of the following. For example, the first rule may be to use the previous transmission power or a function of the previous transmission power for the power of the new transmission or new transmission part. In an example, the first rule may be to use the previous transmission power or a function of the previous transmission power for the determination of the power of the new transmission or new transmission part. In a further example, the first rule may be to include a closed loop portion of a previous transmission in the determination of the power of a new transmission or new transmission part. In an example, the closed loop portion may include accumulated transmit power control (TPC) commands.

The second rule may be to not use previous power control information in the determination of the power for a new transmission or new transmission part. In an example, the second rule may be to not use any previous power control information in the determination of the power for a new transmission or new transmission part.

A retransmission power for a part of a transmission that may be made by a WTRU may be determined by the WTRU. For example, a WTRU may use an ACK, lack of an ACK, or a NACK for a part of a transmission to determine the power setting for a subsequent transmission or retransmission of at least the part of the transmission.

For example, a WTRU may make a multi-part transmission and receive an ACK for at least one part of the transmission and no ACK (or NACK) for at least another part of the transmission. The WTRU may retransmit the part for which the ACK was received with the same power as the original transmission. The WTRU may retransmit the part for which no ACK (or NACK) was received with an increased power.

For example, a WTRU may transmit a 3-part transmission such as a preamble, a data part and a control part. The WTRU may receive no ACK, an ACK for one part, an ACK for two parts, or an ACK for all three parts. The WTRU may retransmit one or more of the parts of the transmission, for example, if at least one ACK is not received for a corresponding part. For example, the WTRU may retransmit all of the parts of the transmission if at least one ACK is not received. When retransmitting, a WTRU may increase the power of a part of the transmission for which an ACK was not received. A WTRU may not increase the power for a part of the transmission for which an ACK was received. It will further be appreciated that not receiving an ACK and receiving a NACK may be used interchangeably in examples discussed herein.

In another example, a WTRU may transmit a preamble and a control part and wait for one or more ACKs before transmitting a data part. The WTRU may receive no ACK, an ACK for one part or an ACK for both parts. The WTRU may retransmit both parts of the transmission if at least one of the parts did not receive an ACK. The WTRU may increase the power for the retransmission of a part that did not receive an ACK. The WTRU may not increase the power for a part for which an ACK was received.

If one ACK is used for multiple parts, for example, the preamble and the control part, and, if the WTRU does not receive an ACK, the WTRU may increase the power for one or both parts when retransmitting. For example the WTRU may or may only increase the power of the preamble part. In another example, the WTRU may increase the power of both the preamble and the control part. When transmitting a subsequent part after receiving an ACK of a previous part, the power of the subsequent part may be determined at least in part based on the power (for example, the latest or current power) of the ACKed previous part. For example, when transmitting a data part after receiving an ACK for a preamble and/or control part, the power of the data part may be determined at least in part based on the transmission power of the preamble and/or control part for which the ACK was received.

When a part may be retransmitted, the part may be modified. For example, one or more transmission parameters or characteristics of the part may be modified. For example, when a preamble part is retransmitted, a different preamble or different time-frequency resources may be used for the transmission.

A power increase for a retransmission may be based on a power step that may be configured. A power increase for a retransmission may be based on or according to a TPC command that may be received, for example, with an ACK/NACK indication from the network node. For example, a WTRU may transmit a preamble and a control part. The WTRU may receive an ACK for the preamble and no ACK (or a NACK) for the control part. A TPC command may also be received in the ACK for the preamble (or NACK for the control part) that may indicate how to increase or by how much to increase the power for the control part. When retransmitting the control part, the WTRU may increase the power based on the received TPC command.

Figure 20:
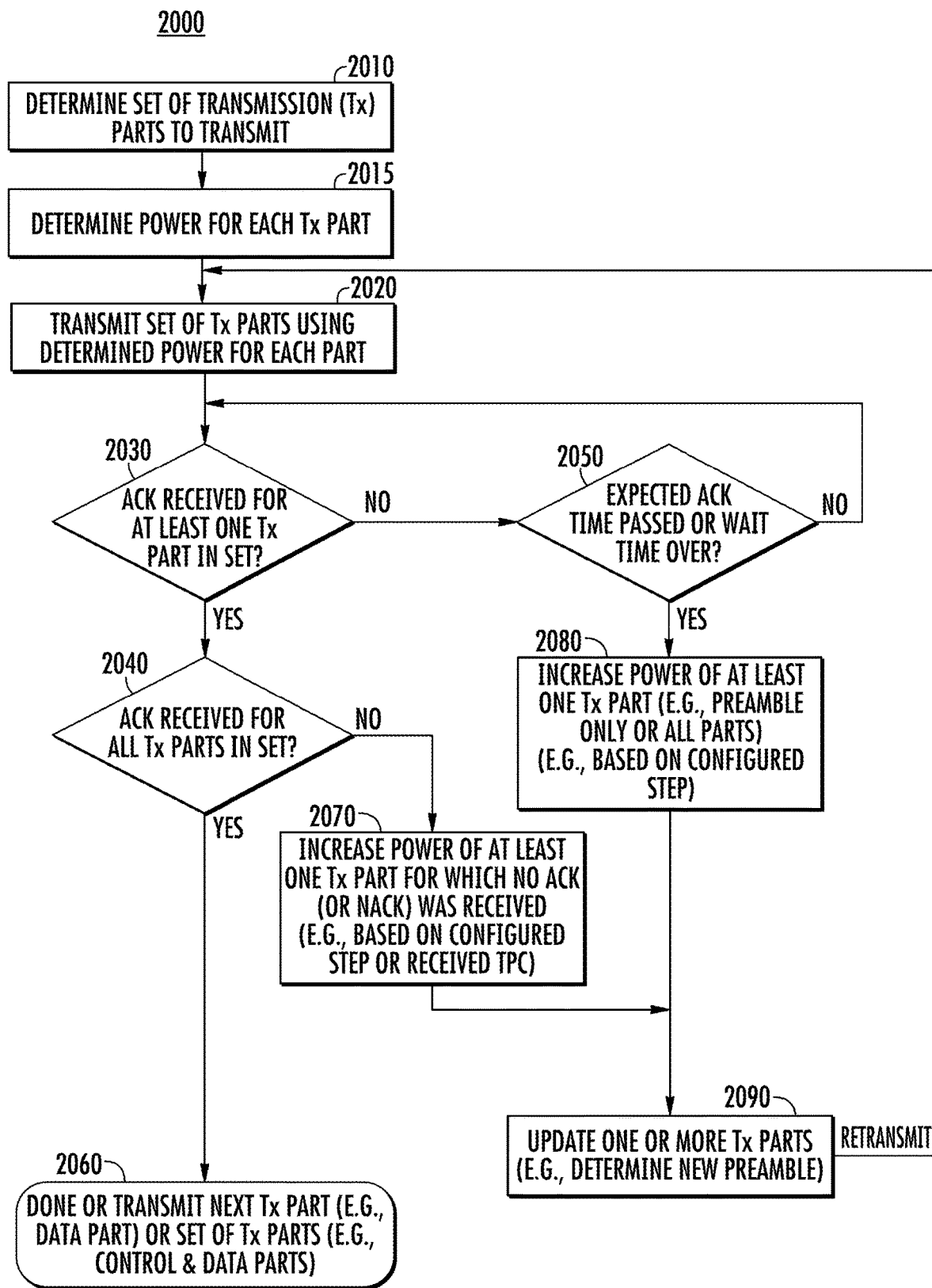
FIG. 20 is a flow diagram illustrating an example of a multi-part transmission process with acknowledgement and power control.

FIG. 20 is a flow diagram illustrating an example of a multi-part transmission process with acknowledgement and power control. In an example shown in flow diagram 2000, a WTRU may determine a set of transmission (Tx) parts to transmit 2010. In an example, the WTRU may determine to transmit a preamble part and a control part. In another example, the WTRU may determine to transmit a preamble part, a control part and a data part.

The WTRU may determine a transmission power for each Tx part 2015. Further, the WTRU may transmit a set of Tx parts using determined the determined power for each part 2020. In an example, the set may be one Tx part. In another example, the set may be more than one Tx part. The WTRU may then determine whether an ACK is received for at least one Tx part in the set of Tx parts 2030.

If an ACK is not received for at least one Tx part in the set, the WTRU may determine whether an expected ACK time passed or whether an expected wait time is over or expired 2050. Further, the WTRU may return to waiting for the ACK reception 2030 if the time has not expired. If a time has lapsed, the WTRU may increase the transmission power of at least one part of the transmission 2080. For example, the WTRU may increase the transmission power of the preamble. In another example, the WTRU may increase the transmission power of the preamble only. In a further example, the WTRU may increase the transmission power of the all parts. Also, in an example, the power increase of at least one part of the transmission may be based on a power step that may be configured.

In a further example, the WTRU may or may not then proceed to updating one or more Tx parts 2090. In an example, the WTRU may update a Tx part by determining a new preamble. In a further example, the WTRU may retransmit the at least one part of the transmission. In an example, the WTRU may retransmit the set of Tx parts using the determined power for each part 2020, including the increased power of at least one part.

If the ACK is received for at least one Tx part in the set, the process may further include determining whether an ACK is received for all Tx parts in the set 2040. If an ACK is not received for all Tx parts, the WTRU may increase the transmission power of at least one part of the transmission 2070. In an example, the WTRU may increase the transmission power of at least one part of the transmission for which no ACK was received. In a further example, the WTRU may increase the transmission power of at least one part of the transmission for which a NACK was received. In an additional example, the power increase of at least one part of the transmission may be based on a power step that may be configured.

Similarly to the example above, the WTRU may or may not then proceed to update one or more Tx parts 2090. Further, the WTRU may retransmit the at least one part of the transmission, similarly to the example above. In a further example, the WTRU may retransmit the set of Tx parts using the determined power for each part 2020, including the increased power of at least one part.

If an ACK is received for all Tx parts, the WTRU may determine that the transmission is successfully complete 2060. Further, the WTRU may transmit a next Tx part or a next set of Tx parts during which the process shown in FIG. 20 may be repeated. In an example, the next Tx part may be a data part. In a further example, the next set of Tx parts may be the control part and the data part.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media, such as non-transitory computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a wireless transmit/receive unit (WTRU) for multiple access wireless communications, the method comprising:
   receiving configuration information indicating a set of physical channel frequency resources;
   receiving downlink control information (DCI), wherein the DCI includes an indication of an allocation of at least a subset of the set of physical channel frequency resources;
   determining a time period and one or more physical shared channel frequency resources, wherein the one or more physical shared channel frequency resources are determined from the subset of the set of physical channel frequency resources; and
   transmitting control information in a physical shared channel transmission using the determined one or more physical shared channel frequency resources during the determined time period, wherein the control information includes a WTRU-identifier (ID) associated with the WTRU.

2. The method of claim 1, wherein the control information transmitted in the physical shared channel transmission includes a new data indicator (NDI).

3. The method of claim 1, wherein the physical shared channel transmission further includes data.

4. The method of claim 3, wherein the data transmitted in the physical shared channel transmission includes a retransmission of previously transmitted data.

5. The method of claim 1, wherein the control information transmitted in the physical shared channel transmission includes a retransmission of previously transmitted control information.

6. The method of claim 1, wherein the WTRU is a source WTRU.

7. The method of claim 1, wherein the DCI includes feedback information.

8. A wireless transmit/receive unit (WTRU) for multiple access wireless communications, the WTRU comprising:
a transceiver; and
the transceiver operatively coupled to a processor; wherein:
the transceiver is configured to receive configuration information indicating a set of physical channel frequency resources;
the transceiver is configured to receive a downlink control information (DCI), wherein the DCI includes an indication of an allocation of at least a subset of the set of physical channel frequency resources;
the processor is configured to determine a time period and one or more physical shared channel frequency resources, wherein the one or more physical shared channel frequency resources are determined from the subset of the set of physical channel frequency resources; and
the transceiver and the processor are configured to transmit control information in a physical shared channel transmission using the determined one or more physical shared channel frequency resources during the determined time period, wherein the control information includes a WTRU-identifier (ID) associated with the WTRU.

9. The WTRU of claim 8, wherein the control information transmitted in the physical shared channel transmission includes a new data indicator (NDI).

10. The WTRU of claim 8, wherein the physical shared channel transmission further includes data.

11. The WTRU of claim 10, wherein the data transmitted in the physical shared channel transmission includes a retransmission of previously transmitted data.

12. The WTRU of claim 8, wherein the control information transmitted in the physical shared channel transmission includes a retransmission of previously transmitted control information.

13. The WTRU of claim 8, wherein the WTRU is a source WTRU.

14. The WTRU of claim 8, wherein the DCI includes feedback information.

15. A first wireless transmit/receive unit (WTRU) for multiple access wireless communications, the WTRU comprising:
a transceiver; and
the transceiver operatively coupled to a processor; wherein:
the transceiver is configured to receive control information in a physical shared channel transmission using one or more physical shared channel frequency resources, in a subset of a set of physical channel frequency resources, during a time period, wherein the control information includes a WTRU-identifier (ID) associated with a second WTRU; and
the transceiver and the processor are configured to transmit data based on the control information received in the physical shared channel transmission.

16. The first WTRU of claim 15, wherein the control information received in the physical shared channel transmission includes a new data indicator (NDI).

17. The first WTRU of claim 15, wherein the physical shared channel transmission further includes a retransmission of previously transmitted data.

18. The first WTRU of claim 15, wherein the control information received in the physical shared channel transmission includes a retransmission of previously transmitted control information.

19. The first WTRU of claim 15, wherein the first WTRU is a destination WTRU.

20. The first WTRU of claim 15, wherein the second WTRU is a source WTRU.

* * * * *

UNITED STATES PATENT AND TRADEMARK OFFICE
CERTIFICATE OF CORRECTION

| | |
|---|---|
| PATENT NO. | : 11,943,783 B2 |
| APPLICATION NO. | : 17/401909 |
| DATED | : March 26, 2024 |
| INVENTOR(S) | : Moon-il Lee et al. |

Page 1 of 1

It is certified that error appears in the above-identified patent and that said Letters Patent is hereby corrected as shown below:

In the Specification

At Column 1, Line 9, after the words "U.S. Pat. No. 11,096,162 B2 on", delete "Jul. 28, 2021" and insert therefor --Aug. 17, 2021--.

Signed and Sealed this
Fourteenth Day of May, 2024

Katherine Kelly Vidal
*Director of the United States Patent and Trademark Office*